US010410406B2

(12) United States Patent
Serna et al.

(10) Patent No.: US 10,410,406 B2
(45) Date of Patent: Sep. 10, 2019

(54) ENHANCED THREE-DIMENSIONAL POINT CLOUD RENDERING

(71) Applicant: Trimble AB, Danderyd (SE)

(72) Inventors: Andrés Serna, Avon (FR); Thomas Chaperon, Nogent-sur-Marne (FR)

(73) Assignee: Trimble AB, Danderyd (SE)

( * ) Notice: Subject to any disclaimer, the term of this patent is extended or adjusted under 35 U.S.C. 154(b) by 8 days.

(21) Appl. No.: 15/443,804

(22) Filed: Feb. 27, 2017

(65) Prior Publication Data
US 2018/0247447 A1 Aug. 30, 2018

(51) Int. Cl.
G06T 15/40 (2011.01)

(52) U.S. Cl.
CPC ............ *G06T 15/405* (2013.01); *G06T 15/40* (2013.01); *G06T 2207/10028* (2013.01); *G06T 2210/56* (2013.01)

(58) Field of Classification Search
CPC ..... G06T 15/405; G06T 15/40; G06T 15/005; G06T 15/503; G06T 15/10
See application file for complete search history.

(56) References Cited

U.S. PATENT DOCUMENTS

| 4,967,392 | A  | * | 10/1990 | Werner   | ................... | G09G 5/393 |
|           |    |   |         |          |                      | 345/505    |
| 6,377,265 | B1 | * | 4/2002  | Bong     | ........................ | G06T 1/20  |
|           |    |   |         |          |                      | 345/505    |
| 8,253,729 | B1 | * | 8/2012  | Geshwind | .......... | H04N 13/0018 |
|           |    |   |         |          |                      | 345/419    |

(Continued)

FOREIGN PATENT DOCUMENTS

| WO | 2012/076757 A1 | 6/2014 |
| WO | 2016/019576 A1 | 2/2016 |

OTHER PUBLICATIONS

Dahlke, D. et al., "Comparison Between Two Generic 3D Building Reconstruction Approaches—Point Cloud Based vs. Image Processing Based," The International Archives of the Photogrammetry, Remote Sensing and Spatial Information Sciences, vol. XLI-B3, 2016 XXIII ISPRS Congress, Jul. 12-19, 2016, Prague, Czech Republic, 6 pages.

(Continued)

*Primary Examiner* — Todd Buttram
(74) *Attorney, Agent, or Firm* — Kilpatrick Townsend & Stockton LLP

(57) ABSTRACT

A method of rendering a three-dimensional point cloud in a two-dimensional display includes inputting the three-dimensional point cloud that includes three-dimensional coordinates of a set of points, creating a depth buffer for the three-dimensional point cloud that includes depth data for the set of points from a viewpoint location. The method further includes determining a foreground depth buffer by, for each respective pixel area of the two-dimensional display, determining a foreground depth by detecting a closest point to the viewpoint location among a subset of the set of points corresponding to the respective pixel area, and assigning a depth of the closest point as the foreground depth for the respective pixel area. The method further includes filtering the depth buffer to obtain a filtered depth buffer by removing points that are not in the foreground, and outputting the filtered depth buffer to the two-dimensional display.

22 Claims, 32 Drawing Sheets

(56) References Cited

U.S. PATENT DOCUMENTS

| | | | |
|---|---|---|---|
| 9,286,680 B1 | 3/2016 | Jiang et al. | |
| 2003/0156122 A1* | 8/2003 | Donahue | G06K 15/12 345/611 |
| 2004/0086175 A1* | 5/2004 | Parker | G06T 11/008 382/154 |
| 2009/0102850 A1* | 4/2009 | Liang | G09G 3/2059 345/545 |
| 2010/0302247 A1* | 12/2010 | Perez | G06K 9/00201 345/440 |
| 2011/0025689 A1* | 2/2011 | Perez | A63F 13/213 345/420 |
| 2011/0115812 A1 | 5/2011 | Minear et al. | |
| 2011/0238239 A1* | 9/2011 | Shuler | G06F 9/5077 701/3 |
| 2012/0307010 A1* | 12/2012 | Evertt | H04N 5/2226 348/46 |
| 2013/0268569 A1* | 10/2013 | Akenine-Moller | G06F 17/30312 707/825 |
| 2014/0293016 A1 | 10/2014 | Benhimane et al. | |
| 2015/0046456 A1* | 2/2015 | Hernandez Londono | G06F 17/3007 707/737 |
| 2015/0104096 A1* | 4/2015 | Melax | G06T 7/004 382/154 |
| 2015/0341552 A1 | 11/2015 | Chen et al. | |
| 2016/0140689 A1* | 5/2016 | Lux | H04N 19/93 345/420 |
| 2016/0148433 A1* | 5/2016 | Petrovskaya | G06T 19/006 345/633 |
| 2016/0283165 A1* | 9/2016 | Robinson | G06F 3/061 |
| 2016/0335796 A1* | 11/2016 | Roimela | G06T 17/05 |
| 2017/0039765 A1* | 2/2017 | Zhou | G06T 19/006 |
| 2017/0124742 A1* | 5/2017 | Hasselgren | G06T 11/40 |
| 2017/0213315 A1* | 7/2017 | Chen | G06T 1/60 |
| 2017/0219336 A1 | 8/2017 | Kurtz et al. | |
| 2017/0292828 A1 | 10/2017 | Hillebrand et al. | |
| 2018/0262737 A1 | 9/2018 | Monnier et al. | |

OTHER PUBLICATIONS

Extended European Search Report for Application No. 18305240.6-1210, dated Jul. 11, 2018, 9 pages.

Cho, S. et al., "Efficient Colorization of Large-scale Point Cloud using Multi-pass Z-ordering," IEEE Computer Society, 2014 Second International Conference on 3D Vision, pp. 689-696.

U.S. Appl. No. 15/451,834 Non-Final Office Action dated Jun. 14, 2018, 27 pages.

International Search Report and Written Opinion for Application No. PCT/IB2018/051155, dated Jun. 25, 2018, 21 pages.

Notice of Allowance for U.S. Appl. No. 15/451,834, dated Oct. 31, 2018, 8 pages.

Tavares, D. L. et al., "Efficient Approximate Visibility of Point Sets on the GPU," $23^{rd}$ Conference on Graphics, Patterns and Images (SIBGRAPI), Aug. 30, 2010, pp. 239-246.

Lin, W. "Mathematical Morphology and Its Applications on Image Segmentation," Jun. 7, 2000, Dept. of Computer Science and Information Engineering, National Taiwan University, 65 pages.

Invitation to Pay Additional Fees and Partial Search Report for Application No. PCT/IB2018/051155, dated May 4, 2018, 16 pages.

* cited by examiner

ENHANCED THREE-DIMENSIONAL POINT CLOUD RENDERING

FIELD OF THE INVENTION

Embodiments described herein relate generally to rendering of three-dimensional point clouds, and more particularly, to rendering of three-dimensional point clouds using occlusions.

BACKGROUND

In the last 30 years or so, the acquisition of three-dimensional (3D) point clouds has become an important surveying technique for gathering geospatial information in indoor and outdoor environments. A 3D point cloud may include X, Y, and Z coordinates of a set of points in a 3D coordinate system. These points are often intended to represent the external surface of an object. 3D point clouds can be acquired by 3D scanners, stereo vision cameras, time-of-flight lidar systems, and the like.

Thanks to recent improvements in quality and productivity, 3D data are becoming mainstream in many applications, such as urban analysis, building monitoring, industrial modeling, digital terrain generation, forest monitoring, documentation of cultural heritage, among others. In spite of the great progress in the acquisition of 3D point clouds, there are still some outstanding issues in data processing and visualization of 3D point clouds. In particular, rendering of 3D scene remains a challenge, which often requires some expert users to be involved.

SUMMARY

According to an embodiment of the present invention, a method of rendering a three-dimensional point cloud in a two-dimensional display includes inputting the three-dimensional point cloud. The three-dimensional point cloud can include three-dimensional coordinates of a set of points representing surfaces of one or more objects. The method further includes creating a depth buffer for the three-dimensional point cloud. The depth buffer can include depth data for the set of points from a viewpoint location. The method further includes determining a foreground depth buffer by, for each respective pixel area of the two-dimensional display, determining a foreground depth by detecting a closest point to the viewpoint location among a subset of the set of points corresponding to the respective pixel area, and assigning a depth of the closest point as the foreground depth for the respective pixel area. The method further includes filtering the depth buffer to obtain a filtered depth buffer by, for each respective pixel area of the two-dimensional display: comparing a depth of each respective point corresponding to the respective pixel area to a foreground depth of the respective pixel area; and removing the respective point from the depth buffer upon determining that the depth of the respective point is greater than the foreground depth of the respective pixel area. The method further includes outputting the filtered depth buffer to the two-dimensional display for displaying a two-dimensional image of the three-dimensional point cloud from the viewpoint location.

According to another embodiment of the present invention, a method of rendering a three-dimensional point cloud in a two-dimensional display includes inputting the three-dimensional point cloud. The three-dimensional point cloud can include three-dimensional coordinates of a set of points representing surfaces of one or more objects. The method further includes creating a depth buffer for the three-dimensional point cloud. The depth buffer can include depth data for the set of points from a viewpoint location. The method further includes determining a foreground depth buffer by, for each respective pixel area of the two-dimensional display, determining a foreground depth by detecting a closest point among a subset of the set of points corresponding to the respective pixel area, and assigning a depth of the closest point as the foreground depth for the respective pixel area. The method further includes filtering the depth buffer to obtain a filtered depth buffer by, for each respective pixel area of the two-dimensional display: comparing a depth of each respective point corresponding to the respective pixel area to a foreground depth of the respective pixel area; and removing the respective point from the depth buffer upon determining that the depth of the respective point is greater than the foreground depth of the respective pixel area. The method further includes performing interpolation among remaining points in the filtered depth buffer to obtain an interpolated depth buffer, and outputting the interpolated depth buffer to the two-dimensional display for displaying a two-dimensional image of the three-dimensional point cloud from the viewpoint location.

According to yet another embodiment of the present invention, a method of rendering a three-dimensional point cloud in a two-dimensional display includes inputting the three-dimensional point cloud. The three-dimensional point cloud can include three-dimensional coordinates of a set of points representing surfaces of one or more objects. The three-dimensional point cloud can also include color data for each respective point of the set of points. The method further includes creating a depth buffer for the three-dimensional point cloud. The depth buffer can include depth data for the set of points from a viewpoint location. The method further includes creating a color buffer for the three-dimensional point cloud using the color data for each respective point, and segmenting the depth buffer and the color buffer to obtain a segmented depth buffer and a segmented color buffer based on at least one of color, depth, intensity, or orientation. Each of the segmented depth buffer and the segmented color buffer can include one or more segmented regions. The method further includes outputting the segmented depth buffer and the segmented color buffer to the two-dimensional display for displaying a two-dimensional image of the three-dimensional point cloud from the viewpoint location.

According to a further embodiment of the present invention, a method of rendering a three-dimensional point cloud in a two-dimensional display includes inputting the three-dimensional point cloud. The three-dimensional point cloud can include three-dimensional coordinates of a set of points representing surfaces of one or more objects. The method further includes creating a depth buffer for the three-dimensional point cloud. The depth buffer can include depth data for the set of points from a viewpoint location. The method further includes creating a color buffer for the three-dimensional point cloud. The color buffer can include color data for the set of points from a viewpoint location. The method further includes performing customized image processing to the depth buffer and the color buffer to obtain a processed depth buffer and a processed color buffer, and outputting the processed depth buffer and the processed color buffer to the two-dimensional display for displaying a two-dimensional image of the three-dimensional point cloud from the viewpoint location.

DETAILED DESCRIPTION

Embodiments described herein provide methodologies for improved and enriched visualization of 3D point clouds as rendered on two-dimensional (2D) screens. Exemplary rendering methods include "hide-background" rendering, surface-like rendering, and segmentation-based rendering. The methods disclosed herein may be extended to general point cloud processing, such as filtering, segmentation, classification, and computer-aided design (CAD) modeling from point clouds. Embodiments of the present invention can take advantage of the existing graphics pipeline on a graphics processing unit (GPU).

Understanding a 3D point cloud can be difficult for non-expert users for several reasons. First, a 3D point cloud is a discretized version of the real world, which means that the user would see discrete points instead of continuous surfaces as in the real world. As a result, both foreground and background objects may be visible at the same time. Second, when visualizing a 3D point cloud, it may not be easy to identify surfaces, edges or objects. It can be difficult to discern whether a 3D point belongs to a certain object.

Figure 1A:
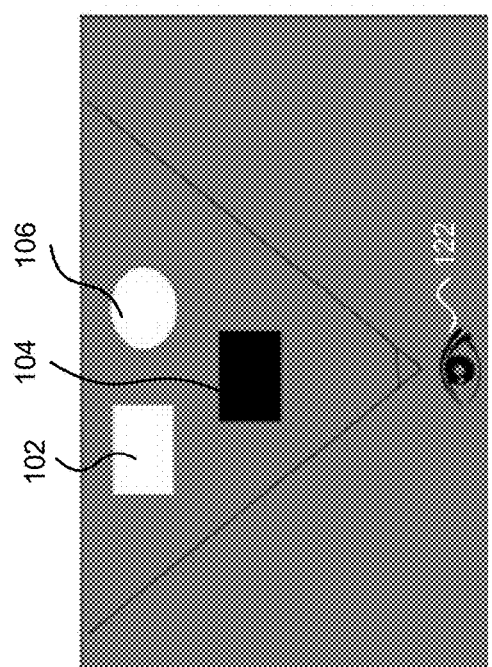
FIGS. 1A-1D illustrate an example situation relating to three-dimensional (3D) point cloud rendering on a two-dimensional (2D) screen.
Figure 1B:
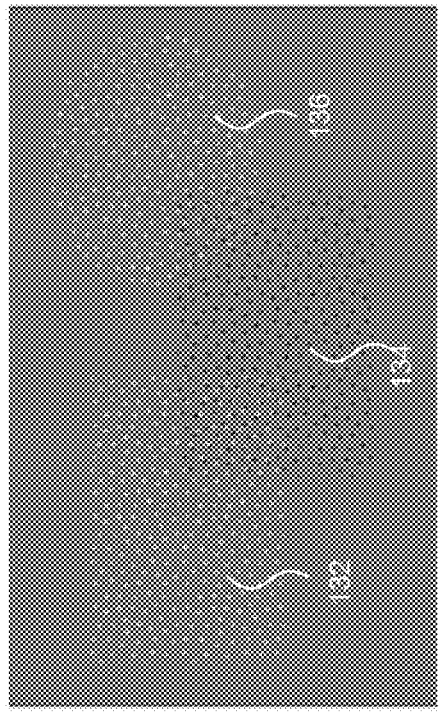
Figure 1C:
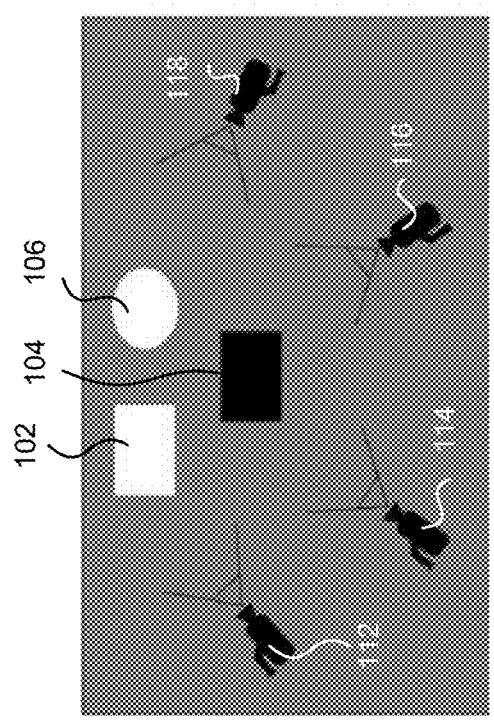

FIGS. 1A-1D illustrate an example situation relating to 3D point cloud rendering. FIG. 1A shows schematically a top view of a 3D scene that includes three objects, namely a white rectangular object 102, a black rectangular object 104, and a white circular object 106. 3D point clouds of the three objects may be acquired by a 3D scanner (or a plurality of 3D scanners) positioned at different static positions, such as the four positions 112, 114, 116, and 118 depicted in FIG. 1A. FIG. 1B illustrates schematically a top view of the 3D scene indicating a view point 122 from which a user may visualize the 3D point clouds acquired by the 3D scanner. It should be noted that this view point 122 may or may not correspond to any of the acquisition positions 112, 114, 116, and 118. FIG. 1C illustrates schematically a 2D image of what a user would see in the real world from the view point 122 illustrated in FIG. 1B. Note that a portion of the white rectangle 102 and a portion of the white circle 106 may be obstructed from view by the black rectangle 104, because they are located behind the black rectangle 104 from the view point 122.

Figure 1D:
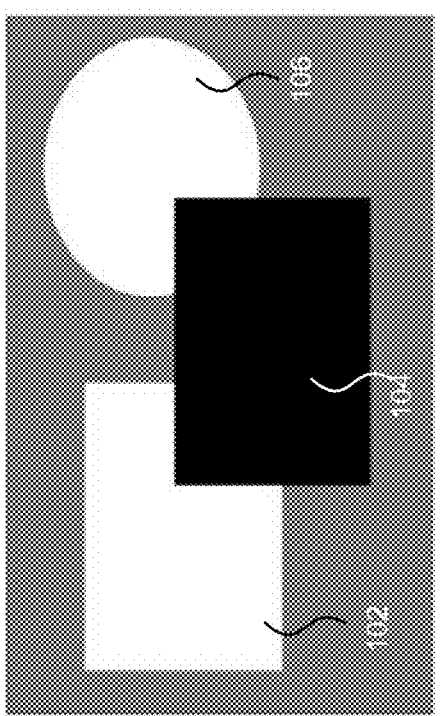

FIG. 1D illustrates an exemplary 2D rendering of the 3D point clouds from the view point 122. As can be seen, some of the white points 132 representing the white rectangle 102 and some of the white points 136 representing the white circle 106 are interspersed with some of the points 134 representing the black rectangle 104. Those white points 132 and 136 represent the portion of the white rectangle 102 and the portion of the white circle 106 that should be obstructed from view by the black rectangle 104 in the foreground. In other words, both foreground and background objects are visible at the same time. This can make it difficult to interpret the rendering of the 3D point clouds. Conventional approaches to solve this problem may include increasing the size of the 3D points on the screen or by interpolating neighboring points in order to create surface-like rendering. These approaches require modification of the original data, which can affect the accuracy of 3D measurements using the 3D point clouds.

Embodiments of the present invention provide methods of rendering 3D point clouds that do not modify the original data, but instead hide the points that should be occluded in the real world. Since no interpolation is applied, the user can have more confidence in the visualized points because they correspond to actual acquired points, which may be important when making precise 3D measurements.

A. General Approach of Enhanced Three-Dimensional Point Cloud Rendering

Figure 2:
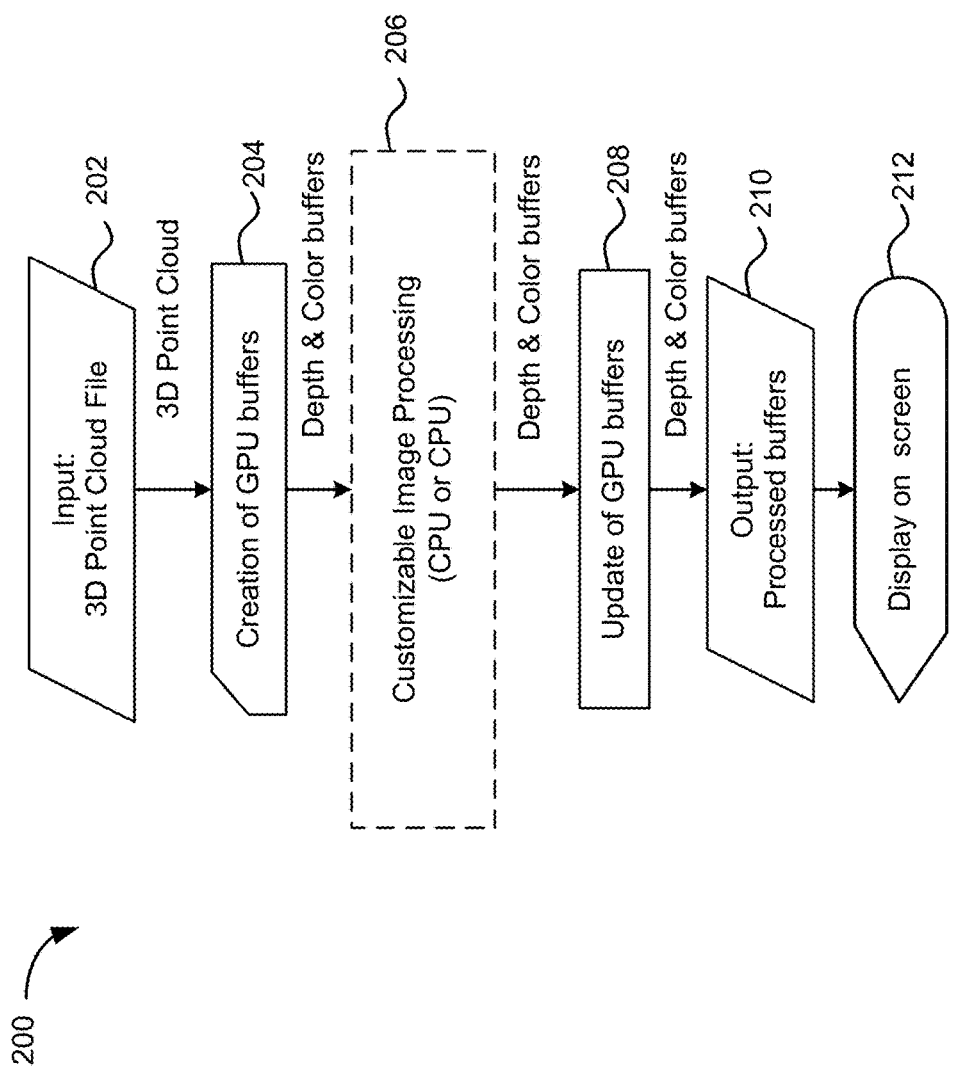
FIG. 2 shows a simplified flowchart illustrating a method of rendering a 3D point cloud in a 2D display according to an embodiment of the present invention.

FIG. 2 shows a simplified flowchart illustrating a method 200 of rendering a 3D point cloud in a 2D display according to an embodiment of the present invention. The method 200 may improve visualization of the 3D point cloud by processing the information rendered on the screen. The method 200 can take advantage of the existing graphics pipeline on a graphics processing unit (GPU) by retrieving and modifying the display buffers to improve visualization.

The method 200 includes, at 202, inputting a 3D point cloud. The 3D point cloud may include X, Y, and Z coordinates of a set of points representing surfaces of one or more objects. The 3D point cloud may also include additional attributes associated with the set of points, such as color, intensity, normals, thermic information, global navigation satellite system (GNSS) data (e.g., global positioning system (GPS) data), and the like. The 3D point cloud may be acquired, for example, by one or more of the following 3D imaging devices: terrestrial laser scanning, aerial laser scanning, mobile laser scanning, hand-held sensors, terrestrial photogrammetry, aerial photogrammetry, and the like.

The method 200 further includes, at 204, creating GPU buffers. A graphics processing unit (GPU) is a specialized electronic circuit designed to rapidly create and manipulate images in a frame buffer intended for outputting to a 2D display. According to some embodiments, the GPU is used to create a depth buffer (also called a z buffer) and a color buffer (also called a texture buffer) from the 3D point cloud. The 3D to 2D mapping can be performed using one or more graphical libraries, such as OpenGL, DirectX, Vulkan, and the like.

The method 200 further includes, at 206, performing customizable image processing. The customizable image processing uses the information already on the GPU, for example in the depth buffer and color buffer, and applies image processing techniques in order to improve and enrich visualization. Particular image processing algorithms can be application-dependent, as described below in some example applications. The processing can be performed on a computer central processing unit (CPU), on the GPU, or both, according to various embodiments.

The method 200 further includes, at 208, updating the GPU buffers using the results of the customizable image processing. The method 200 further includes, at 210, outputting the updated GPU buffers, e.g., the depth buffer and color buffer, to a display device. The method 200 further includes, at 212, displaying a 2D rendering of the point cloud on a screen of the display device using the processed GPU buffers.

The method 200 of rendering a 3D point cloud in a 2D display described above may afford several advantages. For example, the entire processing is carried out on-the-fly, taking advantage of the existing graphics pipeline in the GPU, for a real-time navigation experience. The method 200 can be applied to a variety of 3D input data, such as scanned surface 3D point clouds, volumetric data (e.g., magnetic resonance images (MM) or computed tomography (CT)), depth images, and the like. In addition, this technique does not depend on the amount of data, only on what appears on the screen. Thus, it can be applied to massive datasets (e.g., up to billions of points). The processing can be combined with a variety of rendering modes, such as true color, intensity, point size, normals, and the like. In some embodiments, geometries can also be taken into account during processing. These and other embodiments of the invention along with many of its advantages and features are described in more detail below in conjunction with some specific applications.

B. Improved Visibility by Occlusion

Figure 3:
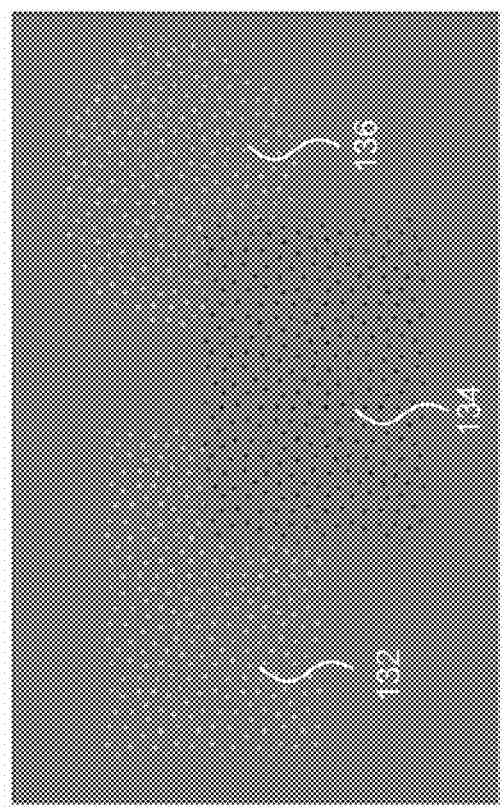
FIG. 3 illustrates an example rendering of the same 3D point cloud rendered in FIG. 1D according to an embodiment of the present invention.

As illustrated in FIG. 1D, one of the problems that can arise when visualizing a 3D point cloud is that both foreground and background objects may be visible at the same time, due to the fact that a 3D point cloud represents a discretized version of the real world. This can cause the rendering of the 3D point cloud to be confusing and difficult to understand. According to an embodiment of the present invention, a method of rendering a 3D point cloud can improve visibility by removing the points corresponding to objects in the background from the rendering (e.g., hiding the points that are in the background). FIG. 3 illustrates an exemplary rendering of the same point cloud rendered in FIG. 1D according to an embodiment of the present invention. Here, in contrast to FIG. 1D, those white points 132 and 136 corresponding to the portion of the white rectangle 102 and the portion of the white circle 106 that are obstructed from the viewpoint 122 by the black rectangle 104 are removed from the rendering, thus avoiding the superposition between the foreground and background points.

According to an embodiment of the present invention, a method of enhanced rendering of a 3D point cloud may include two main customized image processing steps to the GPU buffers (e.g., the depth buffer and the color buffer): (a) estimating foreground depths, and (b) filtering background objects. Estimating the foreground depths may be carried out by, for each respective pixel area on the depth buffer, detecting the closest points to the viewpoint location among a subset of the set of points corresponding to the respective pixel area. Since those points correspond to foreground objects, they should hide the background objects that are located behind them. According to an embodiment, estimating the foreground depths is performed using conventional mathematical morphology algorithms. Filtering background objects includes removing points that are farther than the estimated foreground depth at each pixel area from both the depth buffer and the color buffer. The methods of estimating foreground depths and filtering background points, as well as the entire process of providing enhanced rendering of a 3D point cloud, are described in more detail below in relation to FIGS. 4-6.

Figure 4:
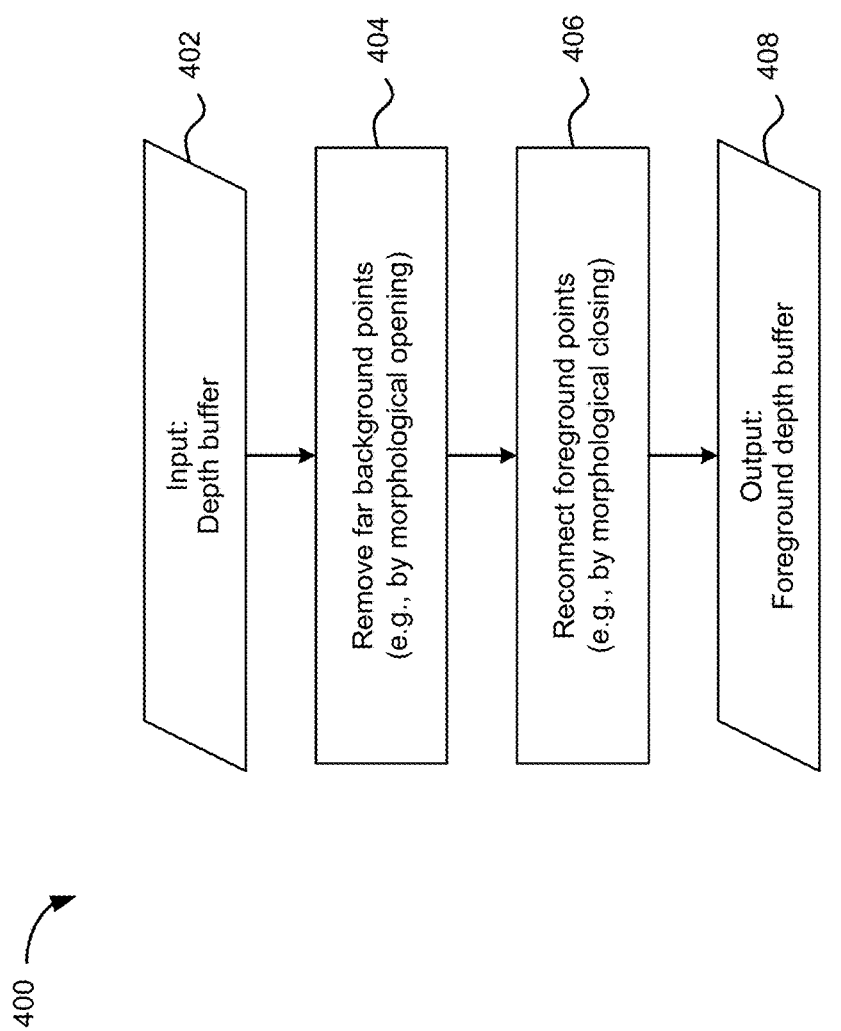
FIG. 4 shows a simplified flowchart illustrating a method of estimating foreground depths according to an embodiment of the present invention.

FIG. 4 shows a simplified flowchart illustrating a method 400 of estimating foreground depths according to an embodiment of the present invention. The method 400 includes, at 402, inputting the depth buffer of the 3D point cloud. The 3D point cloud includes three-dimensional coordinates of a set of points representing surfaces of one or more objects. It may also include additional attributes, such as color, intensity, normals, and the like. The depth buffer includes depth data for the set of points from a viewpoint location.

The method 400 further includes, at 404, removing background points, for example by applying an opening operation of a mathematical morphology algorithm to the depth buffer. In one embodiment, the mathematical morphology algorithm is based on a min-max algebra. Removing background points may include applying mathematical operations on the closest-farthest points in each pixel area of the depth buffer.

The method 400 further includes, at 406, reconnecting the foreground points, for example by applying a closing operation of the mathematical morphology algorithm to the depth buffer. The combination of the steps 404 and 406 results in a foreground depth buffer, which includes a foreground depth for each pixel area of the depth buffer. The method 400 may further include, at 408, outputting the foreground depth buffer.

Figure 5:
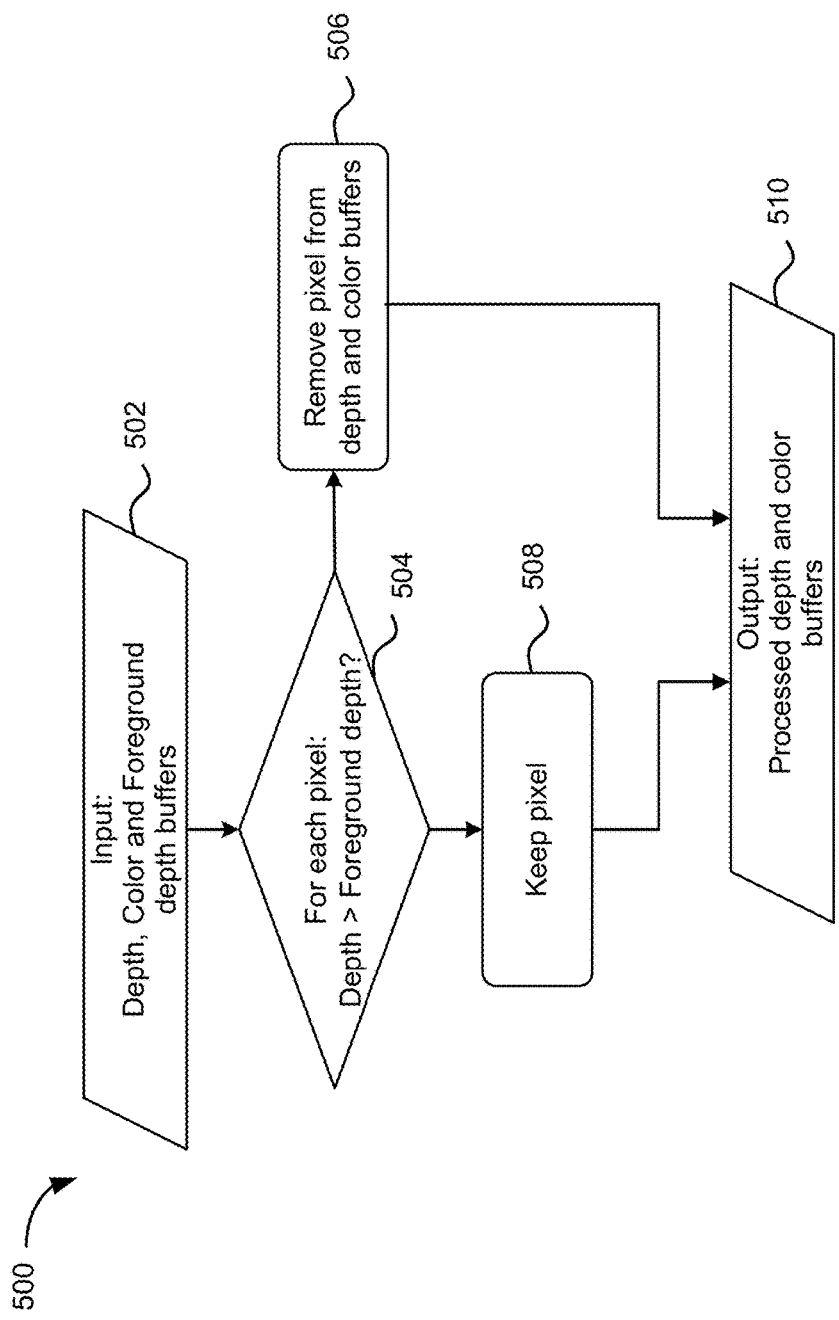
FIG. 5 shows a simplified flowchart illustrating a method of filtering background points according to an embodiment of the present invention.

FIG. 5 shows a simplified flowchart illustrating a method 500 of filtering background points according to an embodiment of the present invention. The method 500 includes, at 502, inputting the depth buffer, the color buffer, and the foreground depth buffer (e.g., as generated by the method 400 described above). The method 500 further includes, at 504, for each respective point of the point cloud, determining whether the depth of the respective point is greater than the foreground depth of the corresponding pixel. At 506, upon determining that the depth of the respective point is greater than the foreground depth of the corresponding pixel, that point is removed from both the depth buffer and the color buffer. At 508, upon determining that the depth of the respective point is not greater than the foreground depth of the corresponding pixel, that point is kept.

In one embodiment, determining whether the depth of the respective point is greater than the foreground depth of the corresponding pixel may be performed with respect to a predetermined threshold value. For example, the method 500 may determine a difference between the depth of each respective point and the foreground depth of the corresponding pixel. It may be determined that the respect point is in the background if the difference is greater than the predetermined threshold value. Conversely, it may be determined that the respect point is in the foreground if the difference is not greater than the predetermined threshold value. In some embodiments, the threshold value may be determined by the user based on the particular application.

The method 500 further includes, at 510, outputting the processed depth buffer and color buffer to a display device. The processed depth buffer and color buffer include only those points that are in the foreground from the viewpoint location.

Figure 6:
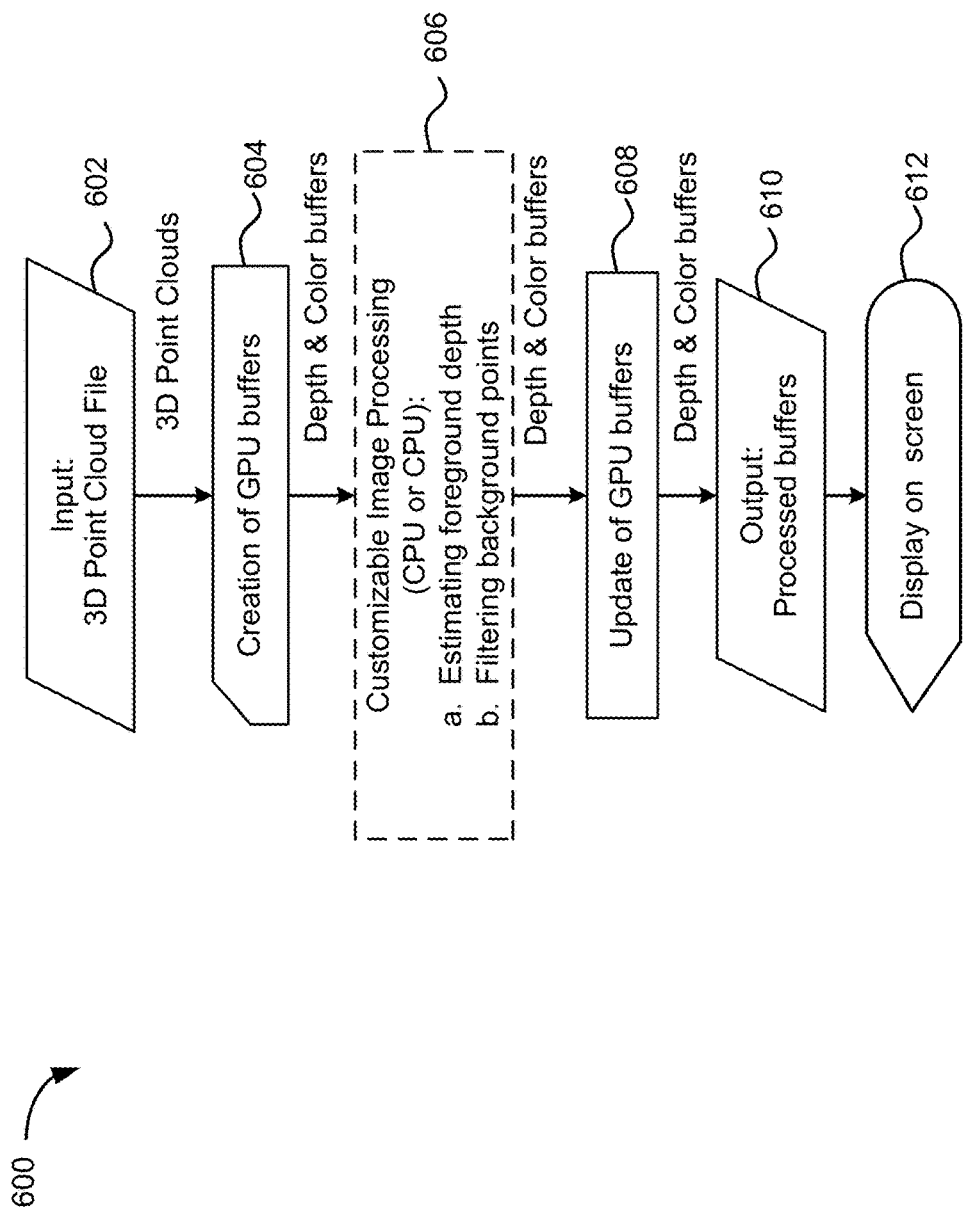
FIG. 6 shows a simplified flowchart illustrating a method of rendering a 3D point cloud according to an embodiment of the present invention.

FIG. 6 shows a simplified flowchart illustrating a method 600 of enhanced rendering of a 3D point cloud according to an embodiment of the present invention. The method 600 includes, at 602, inputting a 3D point cloud. The 3D point cloud may include X, Y, and Z coordinates of a set of points representing surfaces of one or more objects. The method 600 further includes, at 604, creating GPU buffers, such as a depth buffer and a color buffer, for the 3D point cloud from a given viewpoint location.

The method 600 further includes, at 606, performing customized imaging processing of the GPU buffers. The customized imaging processing may include estimating foreground depths and filtering background points, as described above with respect to FIGS. 4 and 5. The method 600 further includes, at 608, updating the GPU buffers using the results of the customized imaging processing. The method 600 further includes, at 610, outputting the processed GPU buffers to a display device, and at 612, rendering the 3D point cloud on a screen of the display device using the processed GPU buffers.

Figure 7A:
FIGS. 7A-7D compare some exemplary renderings of 3D point clouds according to embodiments of the present invention with renderings using conventional methods.
Figure 7B:
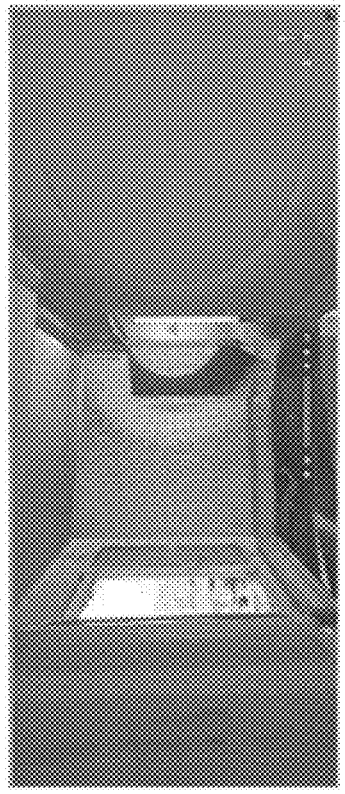

FIGS. 7A-7D compare some exemplary renderings of 3D point clouds according to embodiments of the present invention with renderings using conventional methods. FIGS. 7A and 7B show renderings of a point cloud from a viewpoint inside a room of a house. The point cloud may be acquired using 3D scanners positioned both inside the house and outside the house. FIG. 7A shows a rendering using a conventional rendering method. As can be seen in FIG. 7A, some trees on the left side of the display are actually situated outside the house and should be obstructed from view by the wall. Having those trees visible in the rendering shown in FIG. 7A makes the rendering somewhat confusing. In contrast, in the rendering shown in FIG. 7B, those trees are "occluded" from the rendering using the method described above in relation to FIGS. 4-6. As can be seen, the rendering shown in FIG. 7B is more similar to what a person would actually see standing inside the room.

Figure 7C:
Figure 7D:
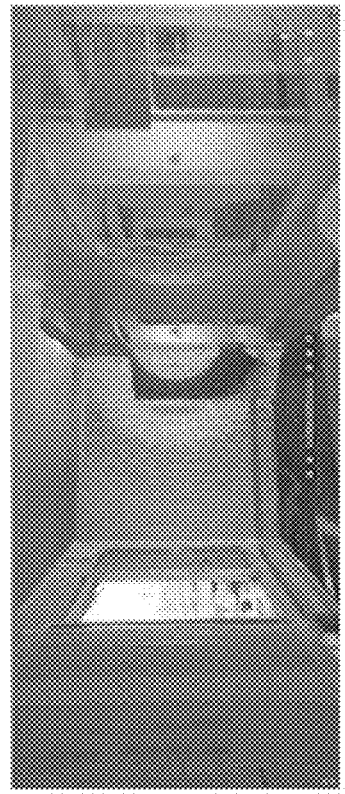

FIGS. 7C and 7D show renderings of another point cloud representing a view from a room of a house. The point cloud may be acquired using 3D scanners positioned in the room, as well as in other rooms of the house. FIG. 7C shows a rendering using a conventional rendering method. As can be seen in FIG. 7C, some features on the right side of the display are actually situated in another room behind a wall, and should not be visible from the viewpoint in the room. Having those features visible in the rendering shown in FIG. 7C makes the rendering somewhat confusing. In contrast, in the rendering shown in FIG. 7D, those features are "occluded" using the method described above in relation to FIGS. 4-6. The rendering shown in FIG. 7D is easier to understand than the rendering shown in FIG. 7C.

The method of rendering a 3D point cloud described above in relation to FIGS. 4-6 may afford several advantages as compared to conventional methods. First, no data pre-processing and no prior knowledge of the scene are required. Second, the 3D point cloud is still shown as a set of distinct points. Thus, a user can inspect measured points individually. The displayed points may be rendered using different rendering properties: true color, intensity, normal shading, custom point size, and the like. In addition, geometries can also be occluded by scan points using this technique. Overlaid images acquired from the scanner can still be displayed along with the point cloud.

Figure 8:
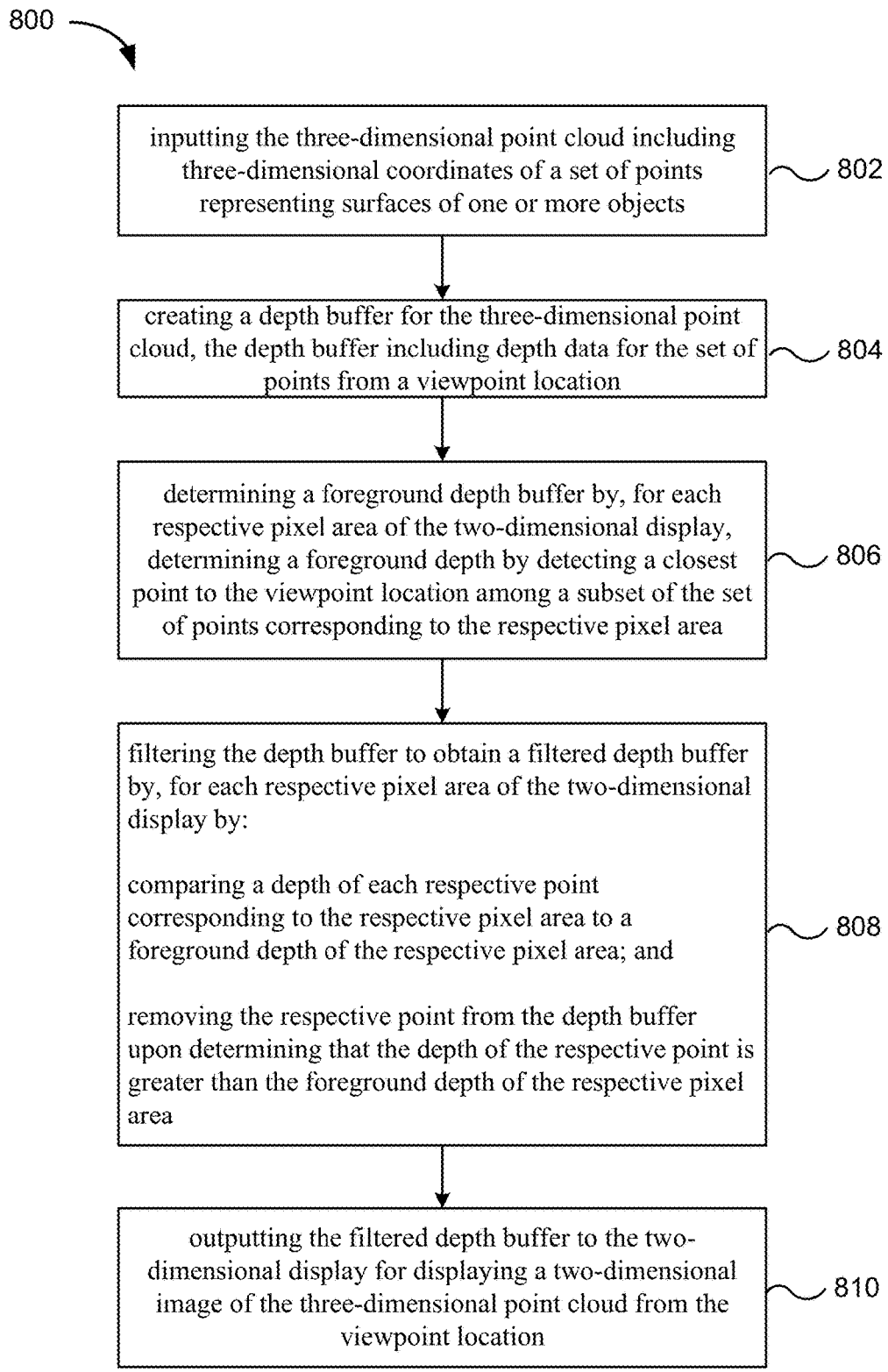
FIG. 8 shows a simplified flowchart illustrating a method of rendering a 3D point cloud according to an embodiment of the present invention.

FIG. 8 shows a simplified flowchart illustrating a method 800 of rendering a three-dimensional point cloud in a two-dimensional display according to an embodiment of the present invention. The method 800 includes, at 802, inputting the three-dimensional point cloud. The three-dimensional point cloud includes three-dimensional coordinates of a set of points representing surfaces of one or more objects. The method 800 further includes, at 804, creating a depth buffer for the three-dimensional point cloud. The depth buffer includes depth data for the set of points from a viewpoint location.

The method 800 further includes, at 806, determining a foreground depth buffer. In one embodiment, the foreground depth buffer is determined by, for each respective pixel area of the two-dimensional display, determining a foreground depth by detecting a closest point to the viewpoint location among a subset of the set of points corresponding to the respective pixel area. The foreground depth for the respective pixel area is the depth of the closest point. In cases where there is only one point in a pixel area, the foreground depth for that pixel area is the depth of that one point.

The method of claim 800 further includes, at 808, filtering the depth buffer to obtain a filtered depth buffer. In one embodiment, filtering the depth buffer is performed by, for each respective pixel area of the two-dimensional display, comparing a depth of each respective point corresponding to the respective pixel area to a foreground depth of the respective pixel area, and removing the respective point from the depth buffer upon determining that the depth of the respective point is greater than the foreground depth of the respective pixel area. The method 800 further includes, at 810, outputting the filtered depth buffer to the two-dimensional display for displaying a two-dimensional image of the three-dimensional point cloud from the viewpoint location.

C. Surface-Like Rendering

One problem that may arise when visualizing a 3D point cloud is that regions with low density of points can result in empty areas on the screen. This can make the rendering of the 3D point cloud difficult to understand for non-expert users. For instance, in the examples illustrated in FIGS. 1D and 3, it may not be easy to understand the discrete points rendered on the screen. Thus, it may be desirable to generate surface-like rendering that simulates the real world view as illustrated in FIG. 1C. One conventional approach to obtain surface-like rendering applies meshing to the entire 3D point cloud file. Such meshing can be time-consuming. Another conventional approach involves increasing the size of the 3D points on the screen. By increasing the size of the 3D points, the original object boundaries may not be preserved.

Embodiments of the present invention provide real-time solutions that process on-the-fly the 3D information already available in the GPU pipeline, while preserving the original edges of the 3D point cloud. Since object boundaries are preserved, the user can have more confidence in the visualized points because they correspond to actual acquired points, which may be important when making precise 3D measurements.

According to an embodiment of the present invention, a method of providing surface-like rendering of a 3D point cloud may include two main customized image processing steps to the GPU buffers (e.g., the depth buffer and the color buffer): (a) hiding background points, and (b) interpolating foreground points. Hiding background points may be carried out by, for each respective pixel area on the depth buffer, detecting the closest points to the viewpoint location among a subset of the set of points corresponding to the respective pixel area. Since those points correspond to foreground objects, they should hide the background objects that are located behind them. In the second main step, foreground points are interpolated in order to obtain a surface-like rendering. Interpolation is a method of constructing new data points within the range of a discrete set of known data points. The methods of hiding background points and interpolating foregrounds points, as well as the entire process of providing surface-like rendering of a 3D point cloud, are described in more detail below in relation to FIGS. 9-13.

Figure 9:
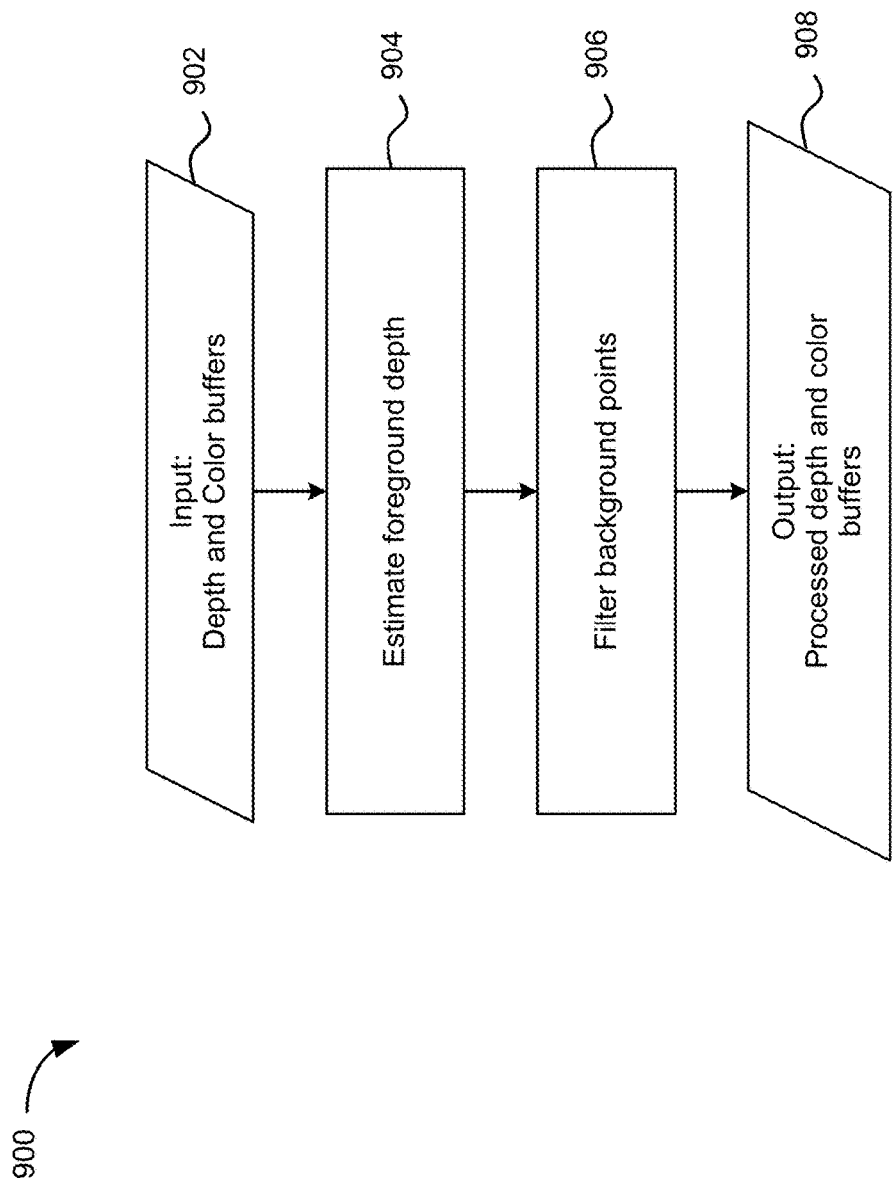
FIG. 9 shows a simplified flowchart illustrating a method of hiding background points according to an embodiment of the present invention.

FIG. 9 shows a simplified flowchart illustrating a method 900 of hiding background points according to an embodiment of the present invention. The method 900 includes, at 902, inputting the depth buffer and the color buffer of a 3D point cloud. The 3D point cloud includes three-dimensional coordinates of a set of points representing surfaces of one or more objects. It may also include additional attributes, such as color, intensity, normals, and the like. The depth buffer includes depth data for the set of points from a viewpoint location. The color buffer includes color data for the set of points.

The method 900 further includes, at 902, estimating foreground depths based on the depth buffer. In one embodiment, estimating the foreground depths may be performed using mathematical morphology algorithms, as discussed above in relation to FIG. 4. The method further includes, at 904, filtering background points. Filtering background objects includes removing points that are farther than the estimated foreground depth at each pixel area from both the depth buffer and the color buffer. Filtering background objects may be performed, for example, using the method discussed above in relation to FIG. 5. The method 900 further includes, at 908, outputting the processed depth buffer and color buffer. The processed depth buffer and color buffer include only those points that are in the foreground from the viewpoint location.

Figure 10:
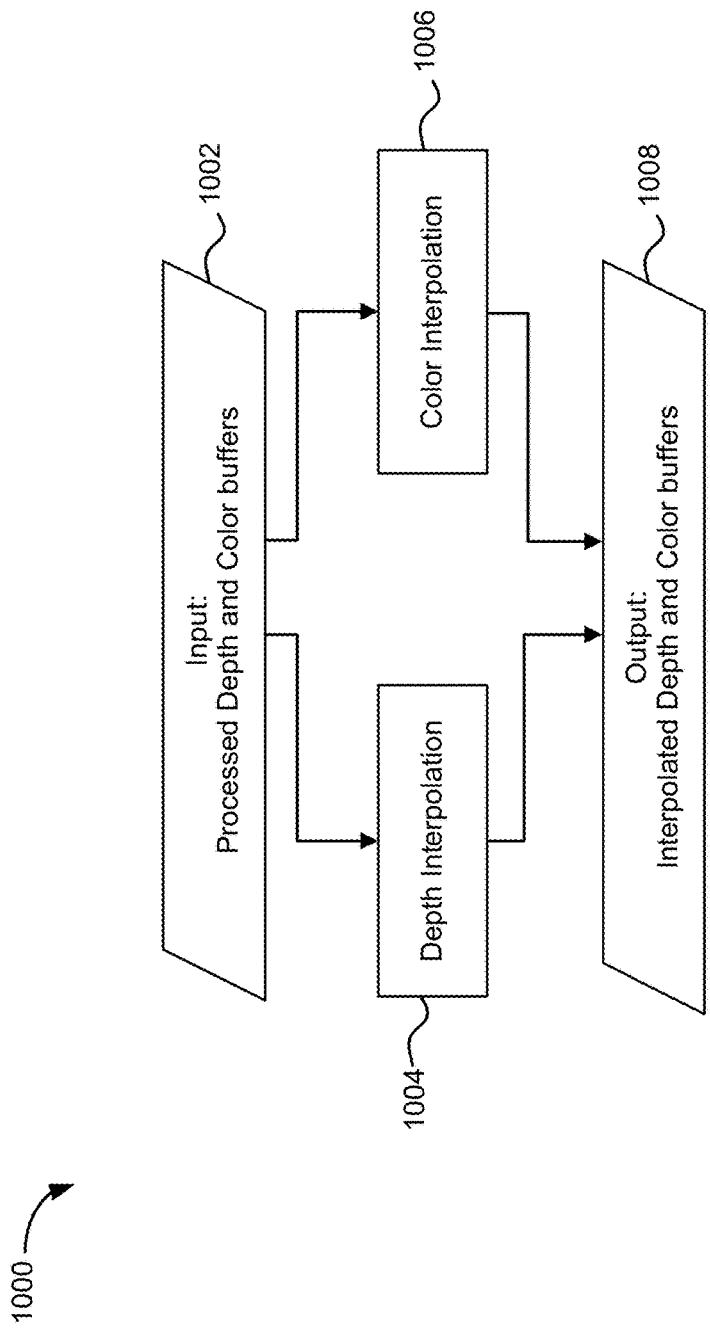
FIG. 10 shows a simplified flowchart illustrating a method of interpolating foreground points according to an embodiment of the present invention.

FIG. 10 shows a simplified flowchart illustrating a method 1000 of interpolating foreground points according to an embodiment of the present invention. The method 1000 includes, at 1002, inputting the depth buffer and the color buffer as processed by the method 900 described above.

The method 1000 further includes, at 1004, interpolating the foreground points in the depth buffer, and at 1006, interpolating the foreground points in the color buffer. Interpolation may be performed using, for example, linear interpolation, polynomial interpolation, morphological processing, inpainting techniques, and the like. It should be noted that the depth buffer and the color buffer may be processed in parallel. The method 1000 further includes, at 1008, outputting the interpolated depth buffer and the color buffer.

Figure 11:
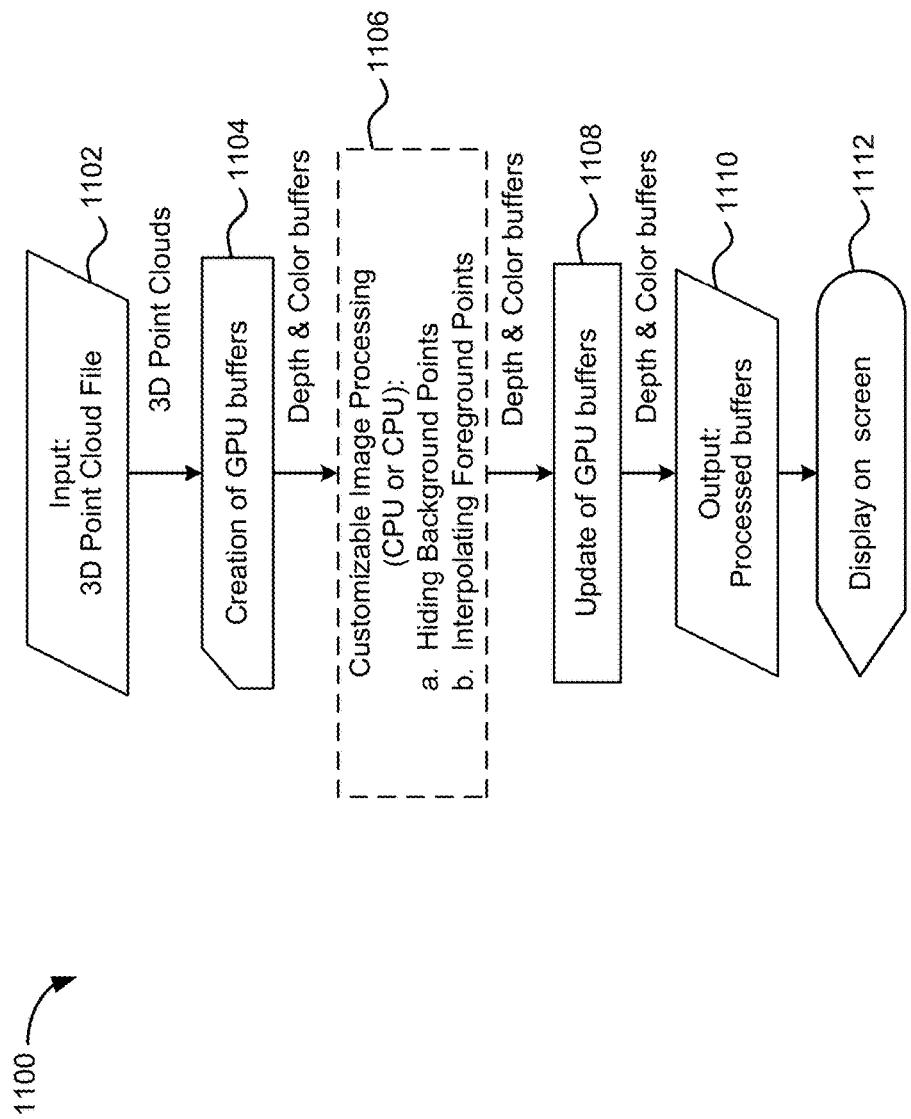
FIG. 11 shows a simplified flowchart illustrating a method for surface-like rendering of a point cloud according to an embodiment of the present invention.

FIG. 11 shows a simplified flowchart illustrating a method 1100 of surface-like rendering of a point cloud according to an embodiment of the present invention. The method 1100 includes, at 1102, inputting a 3D point cloud. The 3D point cloud may include X, Y, and Z coordinates of a set of points representing surfaces of one or more objects. The 3D point cloud may also include additional attributes associated with the set of points, such as color, intensity, normals, thermic information, global navigation satellite system (GNSS) data (e.g., global positioning system (GPS) data), and the like. The method 1100 further includes, at 1104, creating GPU buffers, such as a depth buffer and a color buffer, for the 3D point cloud from a given viewpoint location.

The method 1100 further includes, at 1106, performing customized imaging processing of the GPU buffers. The customized imaging processing may include hiding backgrounds points and interpolating foreground points, for example as described above with respect to FIGS. 9 and 10. The method 1100 further includes, at 1108, updating the GPU buffers using the results of the customized imaging processing performed at 1106. The method 1100 further includes, at 1110, outputting the processed GPU buffers to a display device, and at 1112, rendering the 3D point cloud on a screen of the display device using the processed GPU buffers.

Figure 12A:
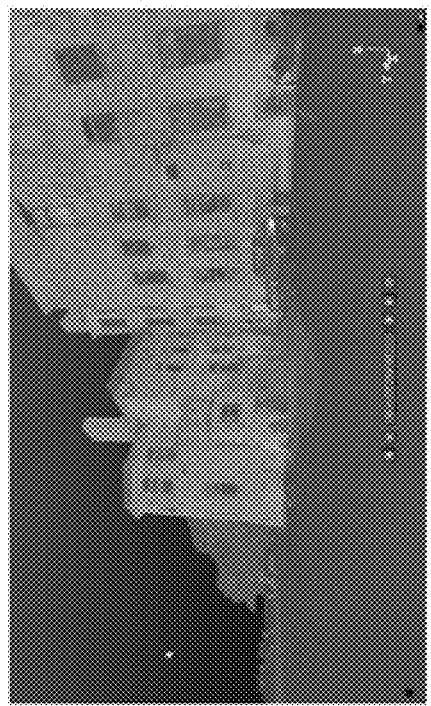
FIG. 12A shows a rendering of a 3D point cloud according to an embodiment of the present invention.
Figure 12B:
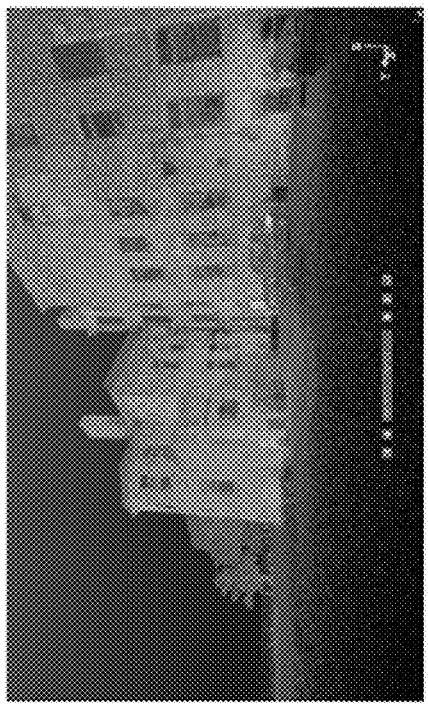
FIG. 12B shows an exemplary surface-like rendering of the same 3D point cloud rendered in FIG. 12A according to an embodiment of the present invention.

FIG. 12A shows a rendering of a 3D point cloud representing a building. FIG. 12B shows a surface-like rendering of the same 3D point cloud according to an embodiment of the present invention, as described above with relation to FIGS. 9-11. As can be seen in FIG. 12A, the ground in front of the building appears as discrete points in the rendering. In contrast, in FIG. 12B, the ground appears as a smooth "surface."

Figure 12C:
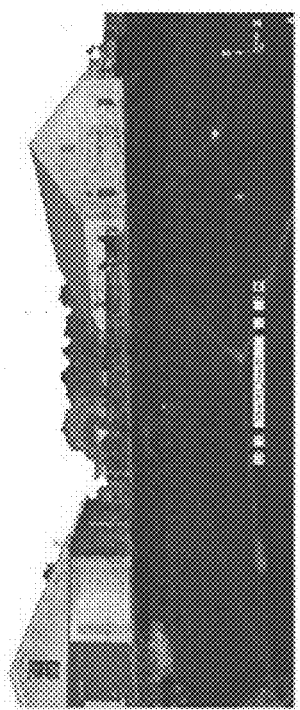
FIG. 12C shows a rendering of a 3D point cloud according to an embodiment of the present invention.
Figure 12D:
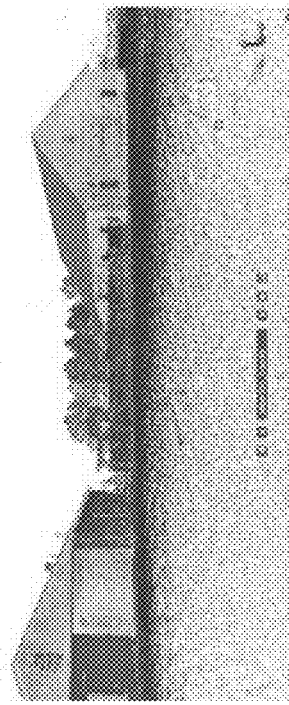
FIG. 12D shows an exemplary surface-like rendering of the same 3D point cloud rendered in FIG. 12C according to an embodiment of the present invention.

FIG. 12C shows a rendering of a 3D point cloud representing a farm house. FIG. 12D shows a surface-like rendering of the same 3D point cloud according to an embodiment of the present invention, as described above with relation to FIGS. 9-11. As can be seen in FIG. 12C, the field in front of the farm house appears as discrete points in the rendering. In contrast, in FIG. 12D, the field appears as smooth "surfaces."

The method of surface-like rendering a 3D point cloud described above in relation to FIGS. 9-11 may afford several advantages as compared to conventional methods. First, the method processes on-the-fly the 3D information already available in the GPU pipeline. Thus, it may provide a real-time navigation experience. Second, the method preserves the original edges of the 3D point cloud. Since object boundaries are preserved, the user can have more confidence in the visualized points because they correspond to actual acquired points, which may be important when making precise 3D measurements.

Figure 13:
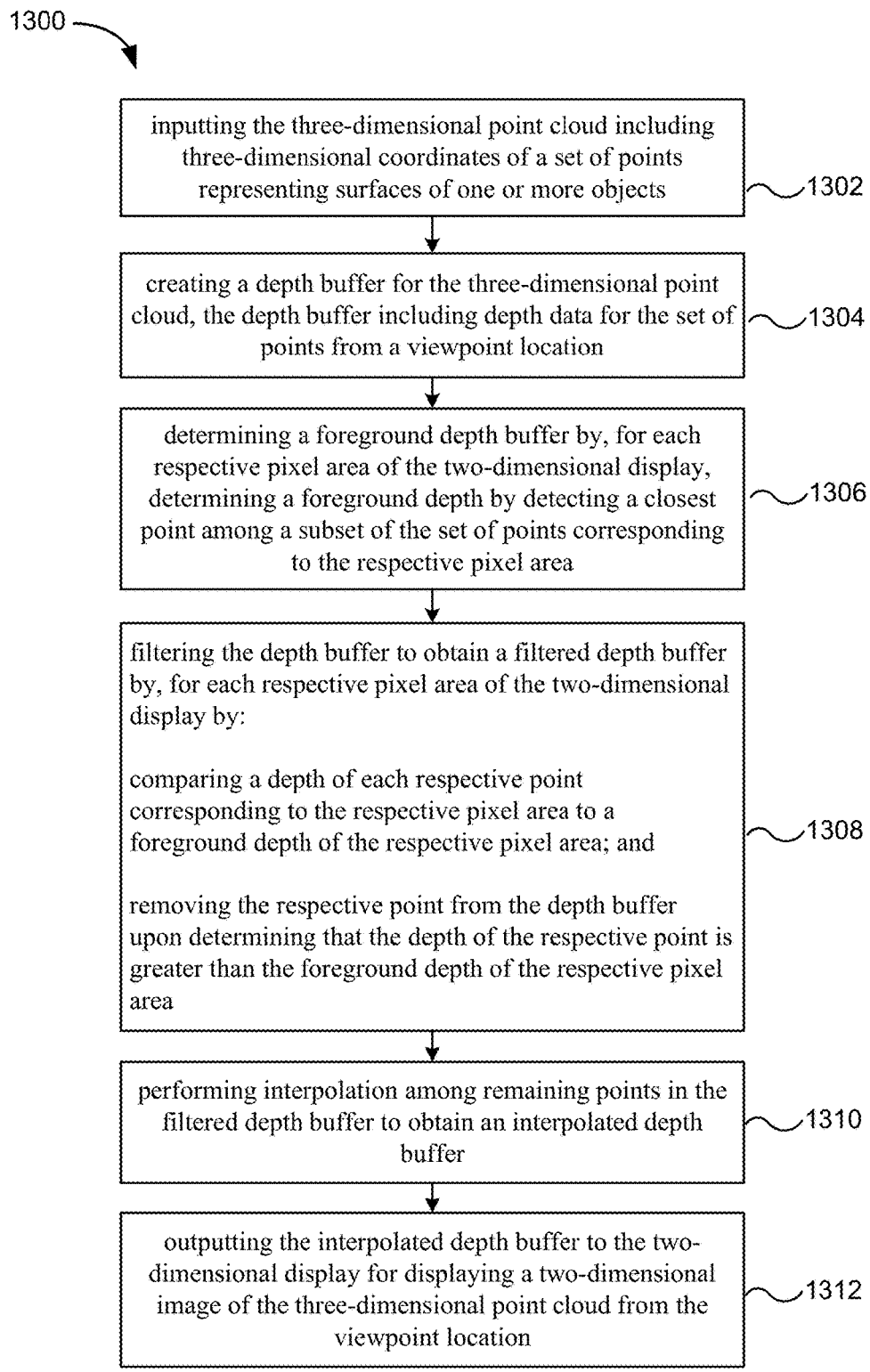
FIG. 13 shows a simplified flowchart illustrating a method for surface-like rendering of a point cloud according to an embodiment of the present invention.

FIG. 13 shows a simplified flowchart illustrating a method 1300 of rendering a three-dimensional point cloud in a two-dimensional display according to an embodiment of the present invention. The method 1300 includes, at 1302, inputting the three-dimensional point cloud. The three-dimensional point cloud includes three-dimensional coordinates of a set of points representing surfaces of one or more objects. The method 1300 further includes, at 1304, creating a depth buffer for the three-dimensional point cloud. The depth buffer includes depth data for the set of points from a viewpoint location.

The method 1300 further includes, at 1306, determining a foreground depth buffer. In one embodiment, the foreground depth buffer is determined by, for each respective pixel area of the two-dimensional display, determining a foreground depth by detecting a closest point among a subset of the set of points corresponding to the respective pixel area. The foreground depth for the respective pixel area is the depth of the closest point. In cases where there is only one point in a pixel area, the foreground depth for that pixel area is the depth of that one point.

The method 1300 further includes, at 1308, filtering the depth buffer to obtain a filtered depth buffer. In one embodiment, filtering the depth buffer is performed by, for each respective pixel area of the two-dimensional display, comparing a depth of each respective point corresponding to the respective pixel area to a foreground depth of the respective pixel area, and removing the respective point from the depth buffer upon determining that the depth of the respective point is greater than the foreground depth of the respective pixel area. The method 1300 further includes, at 1310, performing interpolation among remaining points in the filtered depth buffer to obtain an interpolated depth buffer, and at 1312, outputting the interpolated depth buffer to the two-dimensional display for displaying a two-dimensional image of the three-dimensional point cloud from the viewpoint location.

D. Segmentation-Based Rendering

According to some embodiments of the present invention, rendering algorithms may extract certain features about the scene from the GPU buffers to further enrich visualization of the point cloud. For example, the GPU buffers may be segmented into meaningful sets of pixels corresponding to edges, regions, or semantic classes such as ground, buildings, people, cars, and the like. Displaying the extracted information in the rendering may further improve the user experience when navigating through 3D point cloud.

Some conventional approaches attempt to enrich point clouds by applying pre-processing to the entire 3D point cloud file. Such pre-processing can be time-consuming. In contrast, embodiments of the present invention provide real-time solutions that processes on-the-fly the 3D information already available in the GPU pipeline.

According to an embodiment of the present invention, a method of providing segmentation-based rendering of a 3D point cloud may include three main customized image processing steps (some of them are optional) to the GPU buffers (e.g., the depth buffer and the color buffer): (a) segmentation, and (b) classification, and (c) labeling. Segmentation may include segmenting the depth buffer and the color buffer into meaningful regions, such as regions with similar depth, similar orientation, similar color, and the like. It may be assumed that each segmented region represents a single object in the scene. Classification adds a semantic class to each segmented region. Classification is optional, and may be omitted according to some embodiments. Each segmented or classified region may be labeled, for example with a given color, to provide an enriched rendering to the user. The methods of segmentation, classification, and labeling, as well as the entire process of providing segmentation-based rendering of a 3D point cloud, are described in more detail below in relation to FIGS. 14-17.

Figure 14:
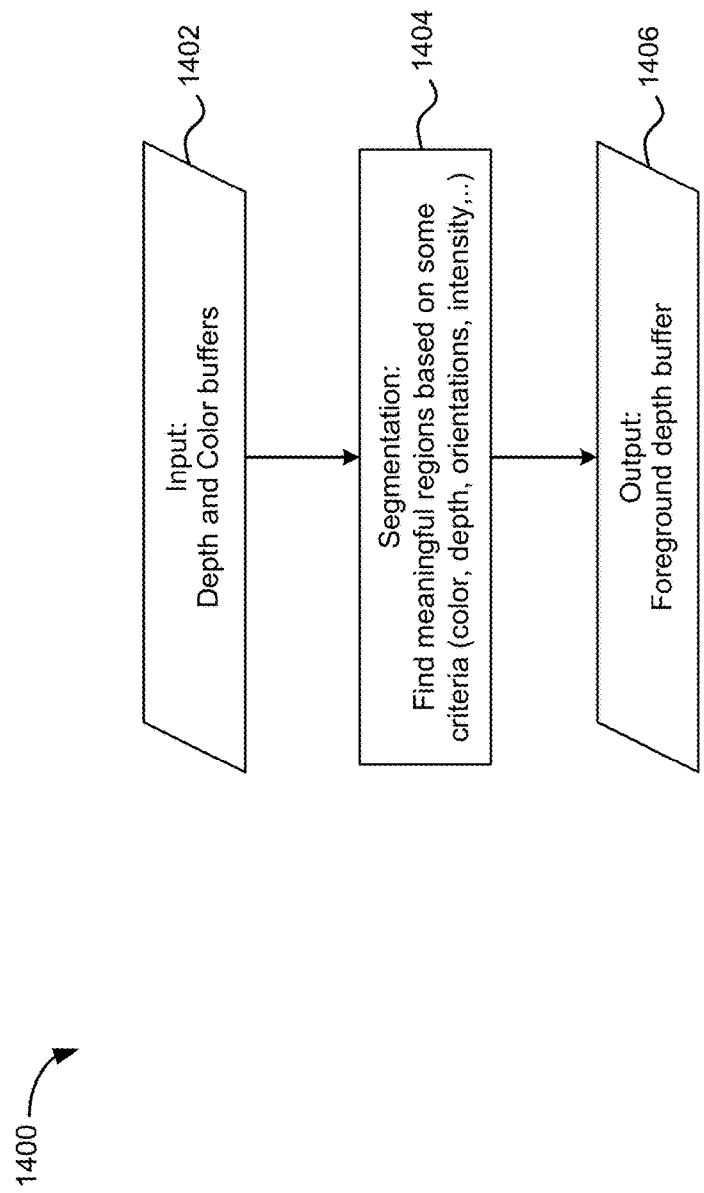
FIG. 14 shows a simplified flowchart illustrating a method of segmenting a depth buffer and/or a color buffer according to embodiments of the present invention.

FIG. 14 shows a simplified flowchart illustrating a method 1400 of segmenting a depth buffer and/or a color buffer according to embodiments of the present invention. The method includes, at 1402, inputting the depth buffer and the color buffer of a 3D point cloud. The 3D point cloud includes three-dimensional coordinates of a set of points representing surfaces of one or more objects. It may also include additional attributes, such as color, intensity, normals, and the like. The depth buffer includes depth data for the set of points from a viewpoint location. The color buffer includes color data for the set of points.

The method 1400 further includes, at 1404, segmenting the depth buffer and/or the color buffer by identifying meaningful regions according certain criteria. For example, the pixels in each identified region may have similar color, similar depth, similar orientation, or similar intensity. The method 1400 further includes, at 1406, outputting the segmented depth buffer and/or the color buffer.

Figure 15:
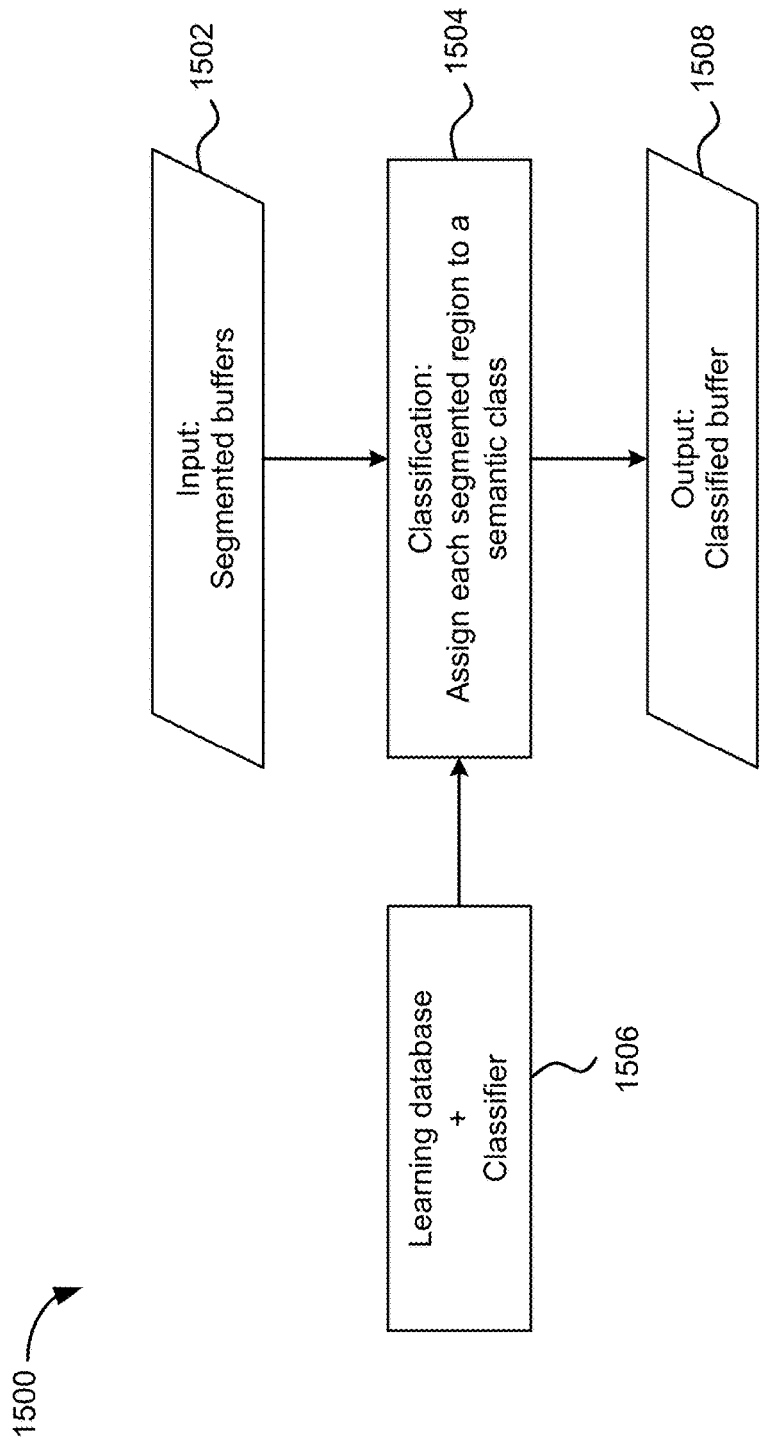
FIG. 15 shows a simplified flowchart illustrating a method of classifying segmented buffers according to an embodiment of the present invention.

FIG. 15 shows a simplified flowchart illustrating a method 1500 of classifying segmented buffers according to an embodiment of the present invention. The method 1500 includes, at 1502, inputting the segmented buffers (the depth buffer and/or the color buffer). The segmented buffers may include a plurality of segmented regions, as resulted from the method 1400 of segmentation described above with relation to FIG. 14.

The method 1500 further includes, at 1504, assigning a semantic class to each segmented region. Semantic classes may include, for example, ground, buildings, people, cars, and the like. Classification may be performed using an external learning database and a classifier, as indicated at step 1506. According to various embodiments, classification may be carried out using supervised, unsupervised, or a combination of supervised and unsupervised techniques. Such techniques may include, for example, clustering techniques, support vector machines, random forests, deep learning, among other conventional machine learning techniques. The method 1500 further includes, at 1508, outputting the classified buffers.

Figure 16:
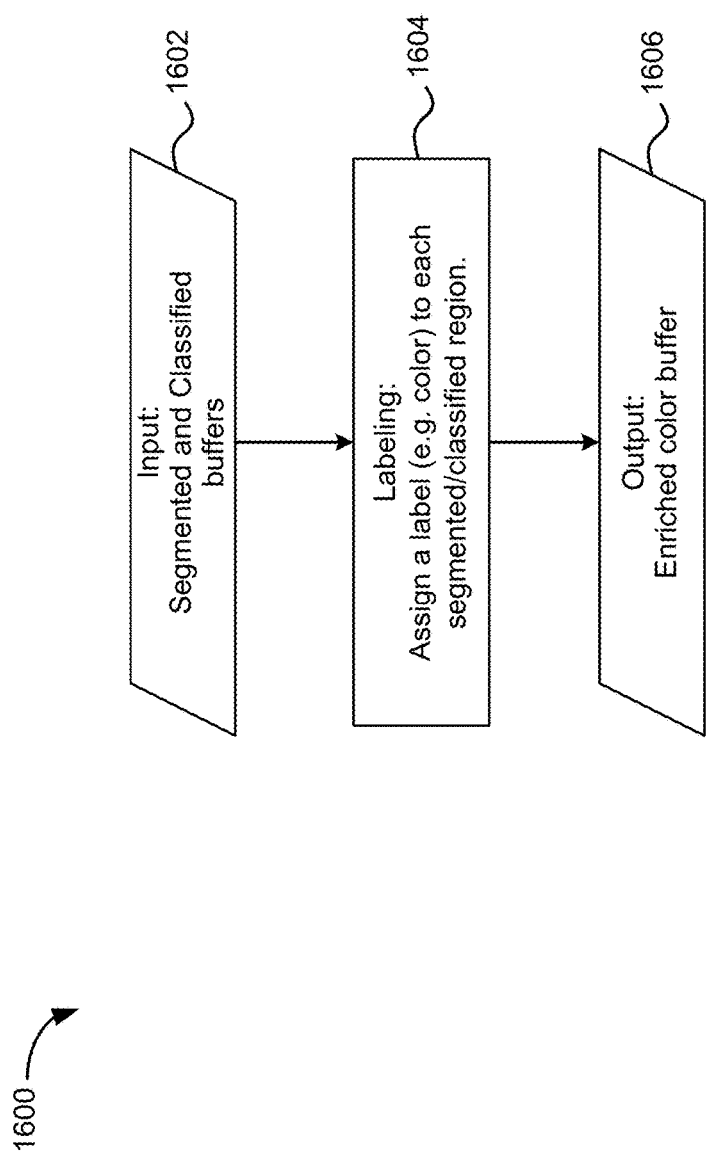
FIG. 16 shows a simplified flowchart illustrating a method of labeling segmented buffers and/or classified buffers according to embodiments of the present invention.

FIG. 16 shows a simplified flowchart illustrating a method 1600 of labeling segmented buffers and/or classified buffers according to embodiments of the present invention. The method 1600 includes, at 1602, inputting the segmented buffers and/or the classified buffers, which may be resulted from the methods 1400 and 1500 described above in relation to FIGS. 14 and 15.

The method 1600 further includes, at 1604, assigning a label to each segmented or classified region. For example, each segmented or classified region may be assigned a unique color so as to obtain an enriched color buffer, according to an embodiment. The method 1600 further includes, at 1606, outputting the enriched color buffer.

Figure 17:
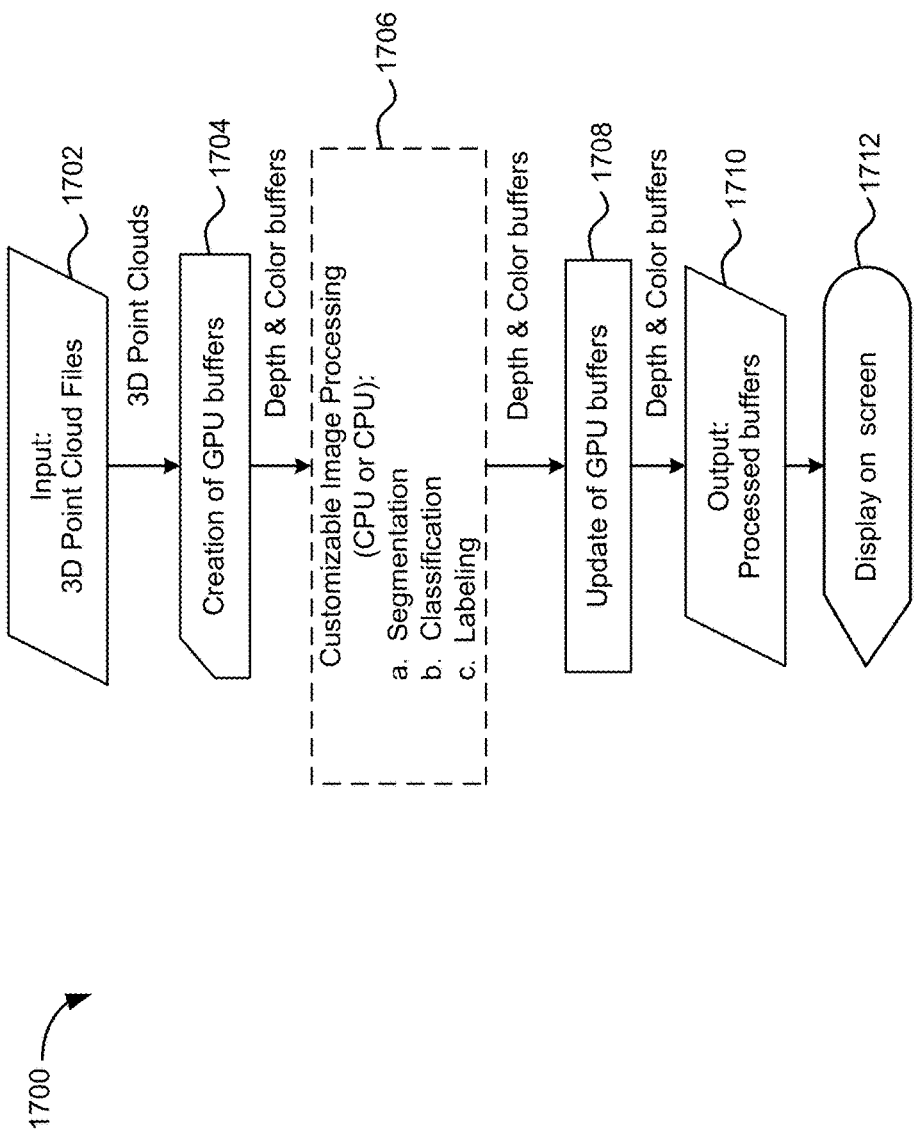
FIG. 17 shows a simplified flowchart illustrating a method of providing segmentation-based rendering of a 3D point cloud according to an embodiment of the present invention.

FIG. 17 shows a simplified flowchart illustrating a method 1700 of providing segmentation-based rendering of a 3D point cloud according to an embodiment of the present invention. The method 1700 includes, at 1702, inputting a 3D point cloud. The 3D point cloud may include X, Y, and Z coordinates of a set of points representing surfaces of one or more objects. The 3D point cloud may also include additional attributes associated with the set of points, such as color, intensity, normals, thermic information, global navigation satellite system (GNSS) data (e.g., global positioning system (GPS) data), and the like. The method 1700 further includes, at 1104, creating GPU buffers, such as a depth buffer and a color buffer, for the 3D point cloud from a given viewpoint location.

The method 1700 further includes, at 1706, performing customized imaging processing of the GPU buffers. The customized imaging processing may include segmenting the GPU buffers, classifying the segmented buffers, and labelling the classified buffers, as described above with respect to FIGS. 14-16. The method 1700 further includes, at 1708, updating the GPU buffers using the results of the customized imaging processing performed at 1706. The method 1700 further includes, at 1710, outputting the processed GPU buffers to a display device, and at 1712, rendering the 3D point cloud on a screen of the display device using the processed GPU buffers.

Figure 18B:
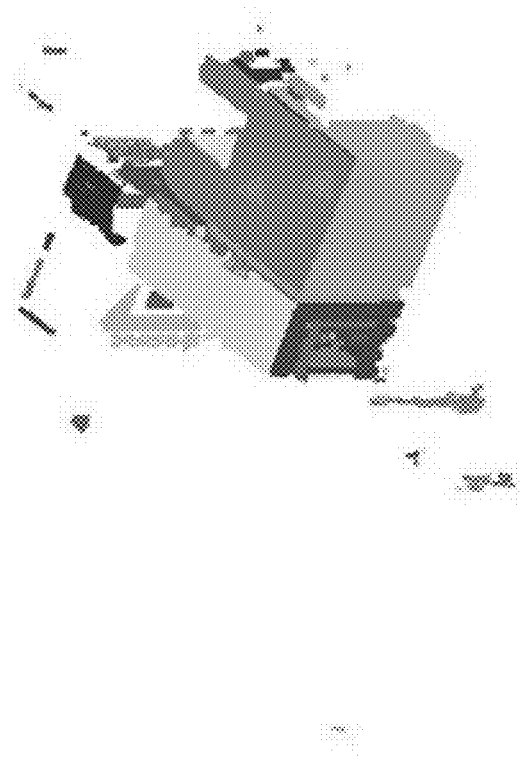
FIG. 18B shows an exemplary rendering of the same 3D point cloud rendered in FIG. 18A based on surface orientation according to an embodiment of the present invention.
Figure 18A:
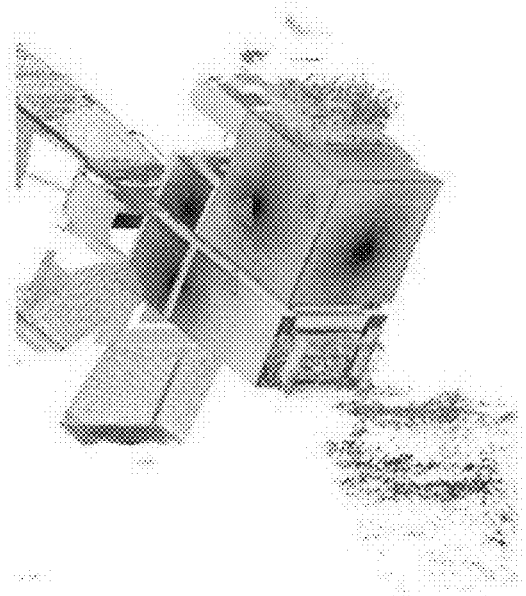
FIG. 18A shows a rendering of a 3D point cloud according to an embodiment of the present invention.

FIG. 18A shows a rendering of a 3D point cloud, and FIG. 18B shows a rendering of the same 3D point cloud based on surface orientation according to an embodiment of the present invention. In FIG. 18B, several regions are identified in the point cloud, where each region includes points representing a surface having a certain orientation. A different color is assigned to each region with a specific orientation.

Figure 19B:
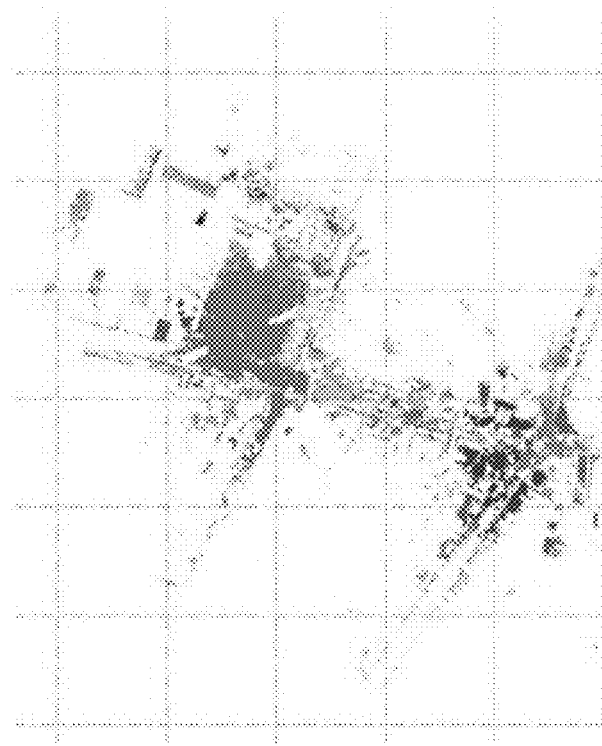
FIG. 19B shows an exemplary rendering of the same 3D point cloud rendered in FIG. 19A based on depth according to an embodiment of the present invention.
Figure 19A:
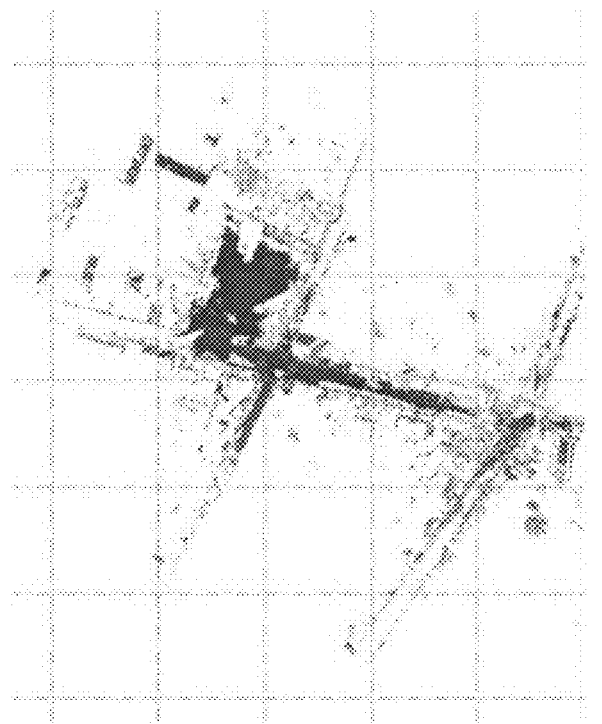
FIG. 19A shows a rendering of a 3D point cloud according to an embodiment of the present invention.

FIG. 19A shows a rendering of a 3D point cloud, and FIG. 19B shows a rendering of the same 3D point cloud based on depth according to an embodiment of the present invention. In FIG. 19B, several regions are identified in the point cloud, where each region includes points having a similar depth. A different color is assigned to each region.

Figure 20B:
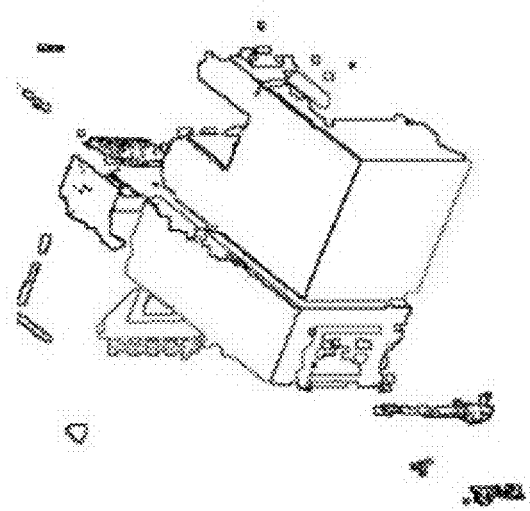
FIG. 20B shows an exemplary rendering of the same 3D point cloud rendered in FIG. 20A based on edges according to an embodiment of the present invention.
Figure 20A:
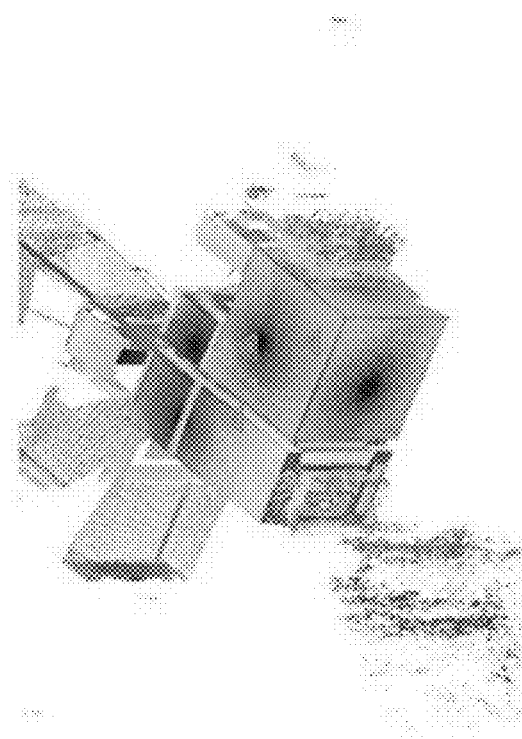
FIG. 20A shows a rendering of a 3D point cloud according to an embodiment of the present invention.

FIG. 20A shows a rendering of a 3D point cloud, and FIG. 20B shows a rendering of the same 3D point cloud based on edges according to an embodiment of the present invention. In FIG. 20B, a number of edges are identified in the point cloud and is rendered.

Figure 21B:
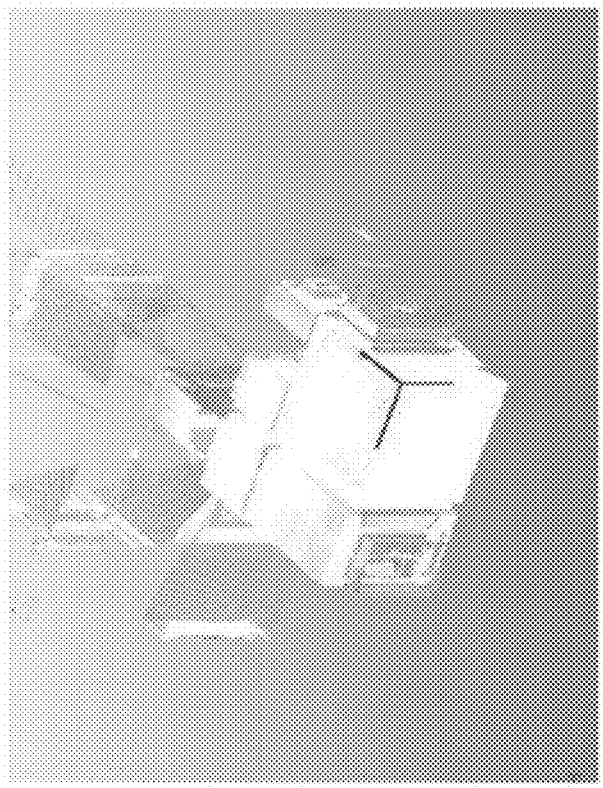
FIG. 21B shows an exemplary rendering of the same 3D point cloud rendered in FIG. 21A based on corners, according to an embodiment of the present invention.
Figure 21A:
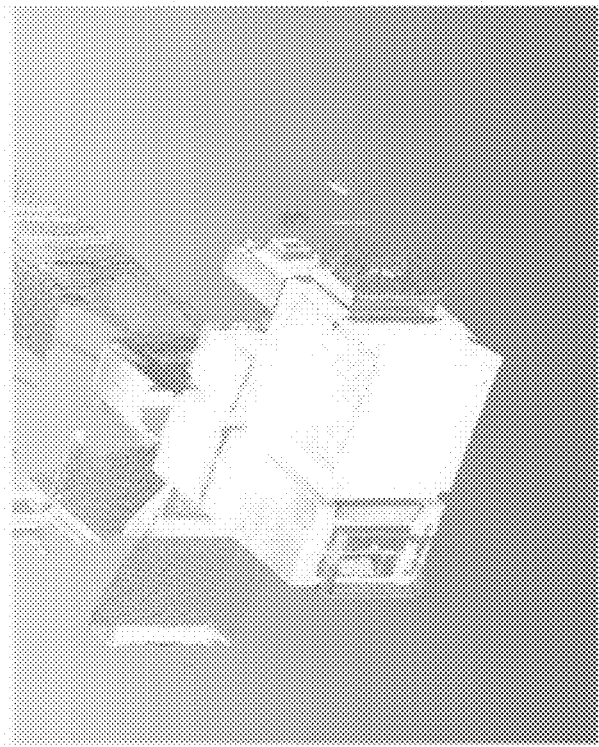
FIG. 21A shows a rendering of a 3D point cloud according to an embodiment of the present invention.

FIG. 21A shows a rendering of a 3D point cloud, and FIG. 21B shows a rendering of the same 3D point cloud based on corners according to an embodiment of the present invention. For example, a corner is identified in the point cloud and is rendered with the red lines In FIG. 21B.

Figure 22B:
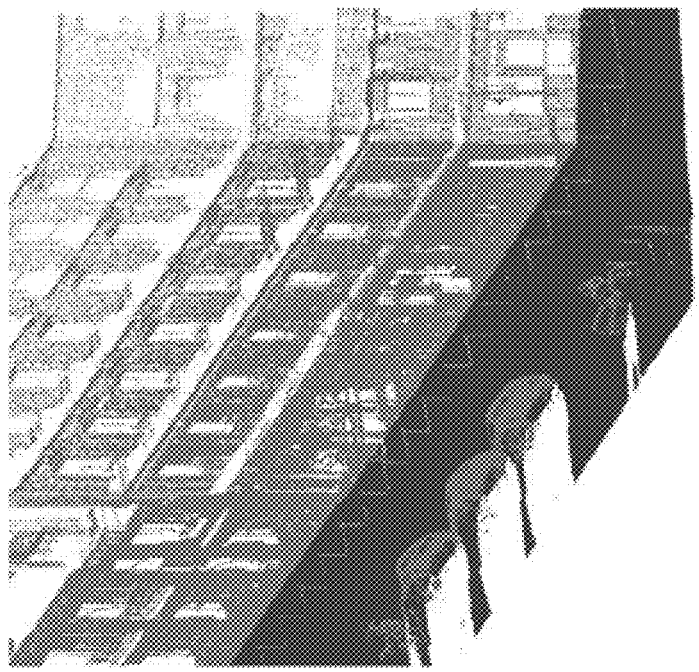
FIG. 22B shows an exemplary segmentation-based renderings of the same 3D point cloud rendered in FIG. 22A according to an embodiment of the present invention.
Figure 22A:
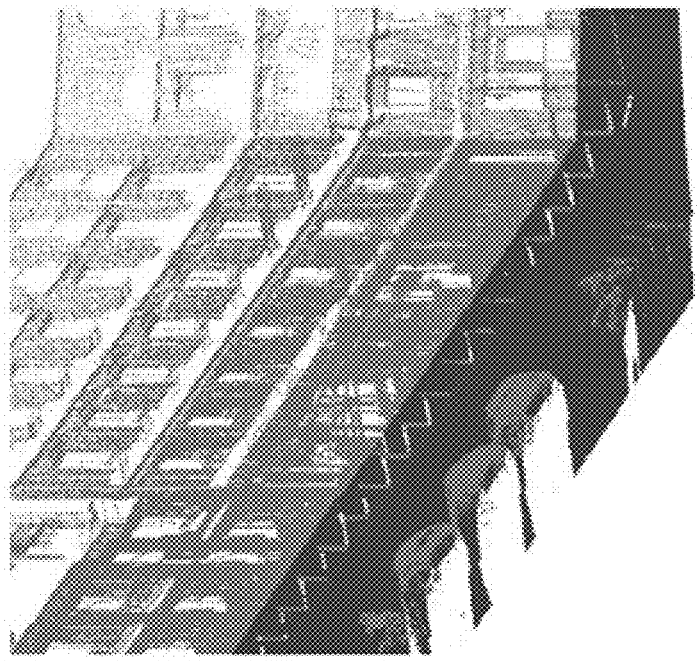
FIG. 22A shows a rendering of a 3D point cloud according to an embodiment of the present invention.

FIG. 22A shows a rendering of a 3D point cloud, and FIG. 22B shows a segmentation-based renderings of the same 3D point cloud according to an embodiment of the present invention. For example, a curb is identified in the point cloud and is rendered with the red line In FIG. 22B.

Figure 23B:
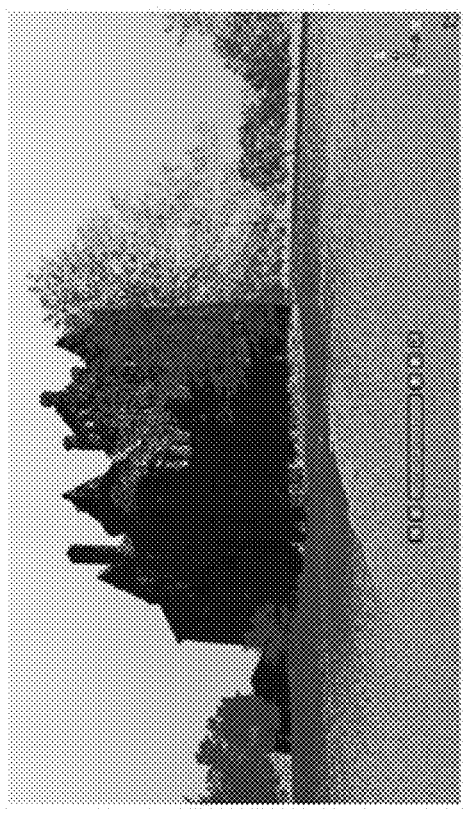
FIG. 23B shows an exemplary segmentation-based renderings of the same 3D point cloud rendered in FIG. 23A based on semantic class according to an embodiment of the present invention.
Figure 23A:
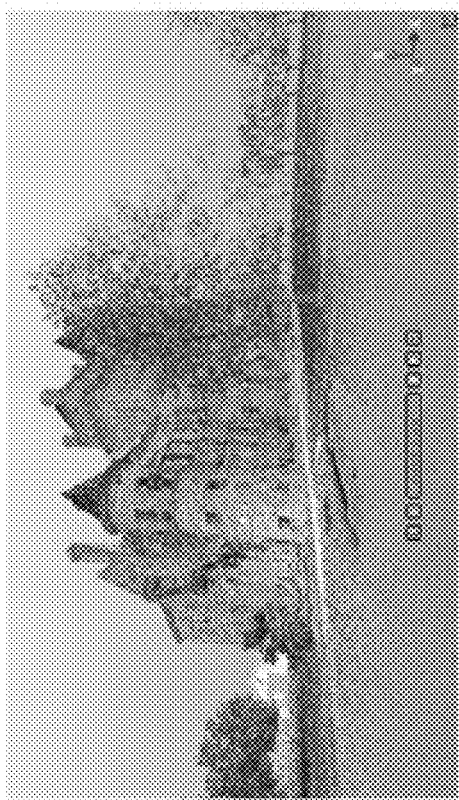
FIG. 23A shows a rendering of a 3D point cloud according to an embodiment of the present invention.

FIG. 23A shows a rendering of a 3D point cloud, and FIG. 23B shows a segmentation-based renderings of the same 3D point cloud based on semantic class according to an embodiment of the present invention. For example, buildings are rendered in blue color, vegetation (e.g., the trees) is rendered in green color, the ground is rendered in brown color, and so on.

The method of segmentation-based rendering a 3D point cloud described above in relation to FIGS. 14-17 may afford several advantages as compared to conventional methods. The method processes on-the-fly the 3D information already available in the GPU pipeline, instead of performing time-consuming pre-processing of the 3D point cloud as required in conventional methods. Displaying the extracted information in the rendering of the point cloud may significantly improve the user experience when navigating through 3D data.

Figure 24:
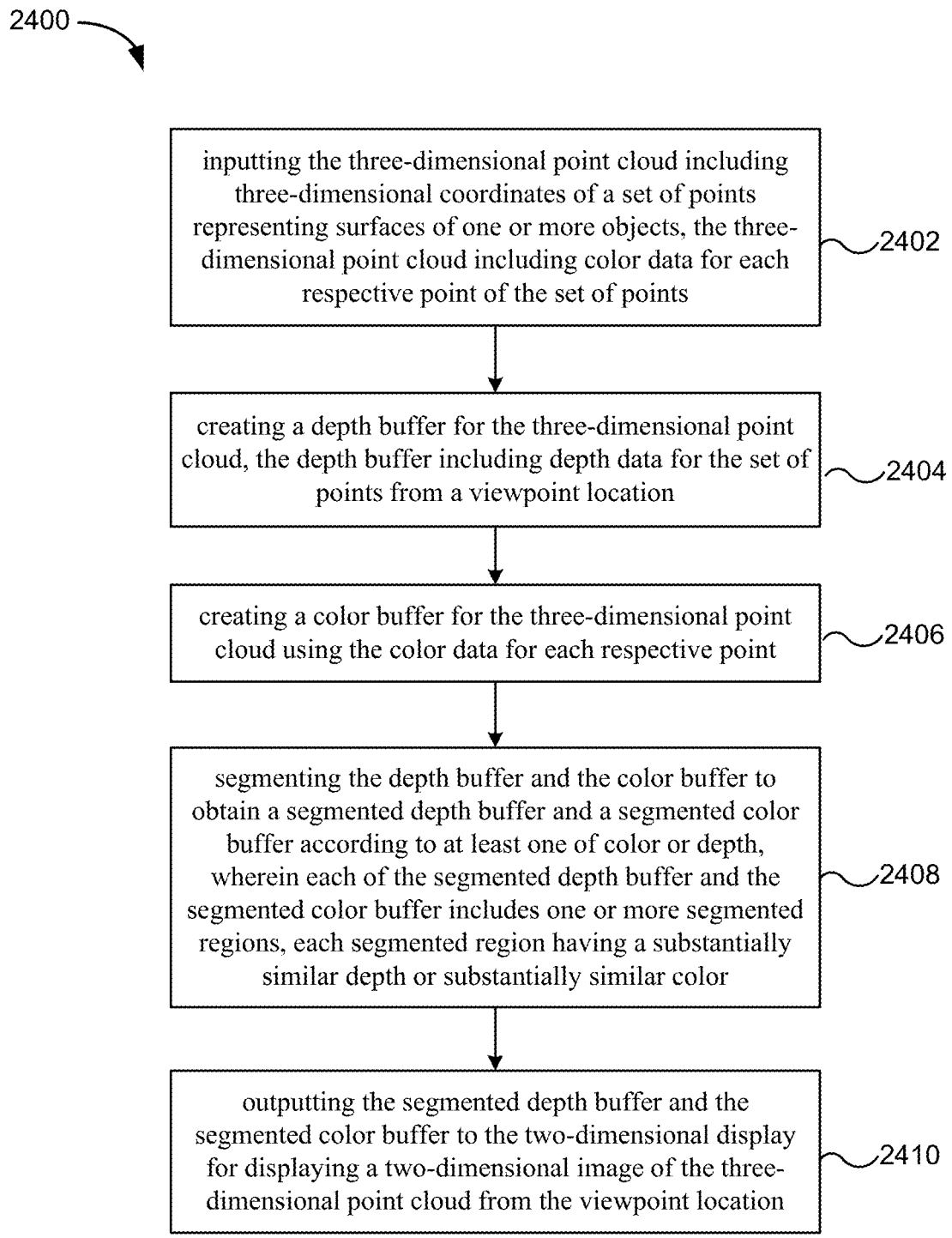
FIG. 24 shows a simplified flowchart illustrating a method of providing segmentation-based rendering of a 3D point cloud according to an embodiment of the present invention.

FIG. 24 shows a simplified flowchart illustrating a method 2400 of rendering a three-dimensional point cloud in a two-dimensional display. The method 2400 includes, at 2402, inputting the three-dimensional point cloud. The three-dimensional point cloud includes three-dimensional coordinates of a set of points representing surfaces of one or more objects. The three-dimensional point cloud also includes color data for each respective point of the set of points.

The method 2400 further includes, at 2404, creating a depth buffer for the three-dimensional point cloud. The depth buffer includes depth data for the set of points from a viewpoint location. The method 2400 further includes, at 2406, creating a color buffer for the three-dimensional point cloud using the color data for each respective point. The method 2400 further includes, at 2408, segmenting the depth buffer and the color buffer to obtain a segmented depth buffer and a segmented color buffer according to at least one of color or depth. Each of the segmented depth buffer and the segmented color buffer may include one or more segmented regions. Each segmented region has a substantially similar depth or substantially similar color according to some embodiments. The method 2400 further includes, at 2410, outputting the segmented depth buffer and the segmented color buffer to the two-dimensional display for displaying a two-dimensional image of the three-dimensional point cloud from the viewpoint location.

E. Extended Processing

As described above in relation to FIGS. 6, 11, and 17, the processed depth buffer and color buffer generated from the customizable image processing steps may be used for visualization purposes. That is, the depth buffer and the color buffer are processed and rendered on the screen in order to improve user visualization and navigation experience. Note that the original point cloud is not modified nor used for any computation (except to create the depth buffer and the color buffer). According to some embodiments of the present invention, the processed buffers can be combined with the original 3D point cloud to generate other types of deliverables.

Figure 25:
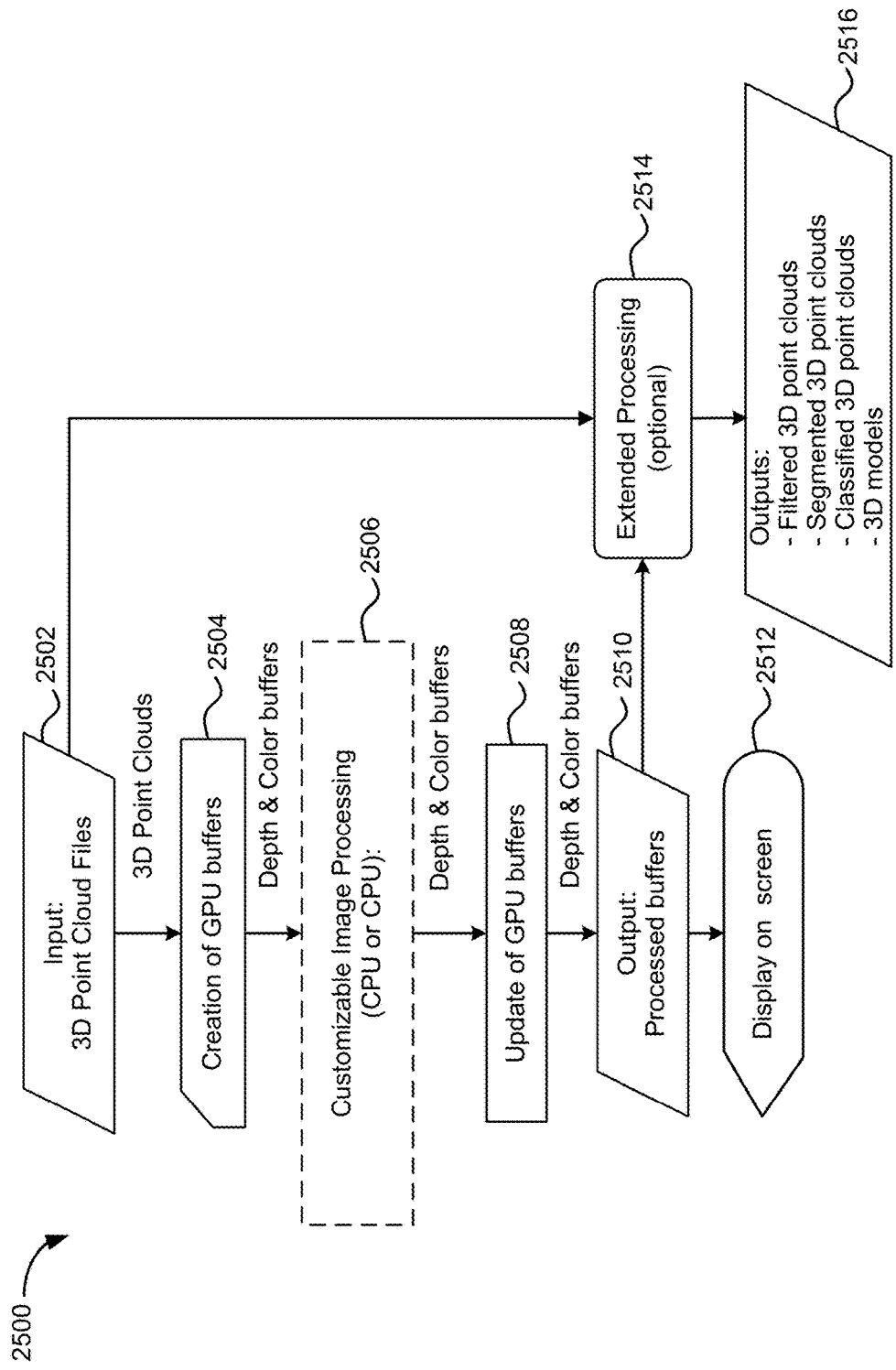
FIG. 25 shows a simplified flowchart illustrating a method of processing 3D point clouds according to an embodiment of the present invention.

FIG. 25 shows a simplified flowchart illustrating a method 2500 of providing extended processing of 3D point clouds according to an embodiment of the present invention. The method 2500 includes, at 2502, inputting a 3D point cloud, and at 2504, creating GPU buffers, such as a depth buffer and a color buffer, for the 3D point cloud from a given viewpoint location.

The method 2500 further includes, at 2506, performing customized imaging processing of the GPU buffers. The customized imaging processing may include, for example, estimating foreground depths and filtering background points, as described above with respect to FIGS. 4 and 5. The customized imaging processing may also include hiding backgrounds points and interpolating foreground points, as described above with respect to FIGS. 9 and 10. The customized imaging processing may further include segmenting the GPU buffers, classifying the segmented buffers, and labelling the classified buffers, as described above with respect to FIGS. 14-16.

The method 2500 further includes, at 2508, updating the GPU buffers using the results of the customized imaging processing performed at 2506. The method 2500 further includes, at 2510, outputting the processed GPU buffers. The method 2500 may further include, at 2512, displaying the processed buffers on a display screen. The method 2500 may further include, at 2514, performing extended processing of the processed buffers. The extended processing may include combining the 3D point cloud and the processed buffers to generate new point clouds. For example, the 3D point cloud and the processed buffers may be combined to generate a filtered 3D point cloud, one or more segmented 3D point clouds, one or more classified 3D point clouds, one or more 3D models, and the like. The method 2500 further includes, at 2516, outputting the generated new point clouds. The methods of generating a filtered 3D point cloud, generating one or more segmented 3D point clouds, generating one or more classified 3D point clouds, and generating one or more 3D models are described in more detail below in relation to FIGS. 27-29 and 32.

Figures 26A, 26B:
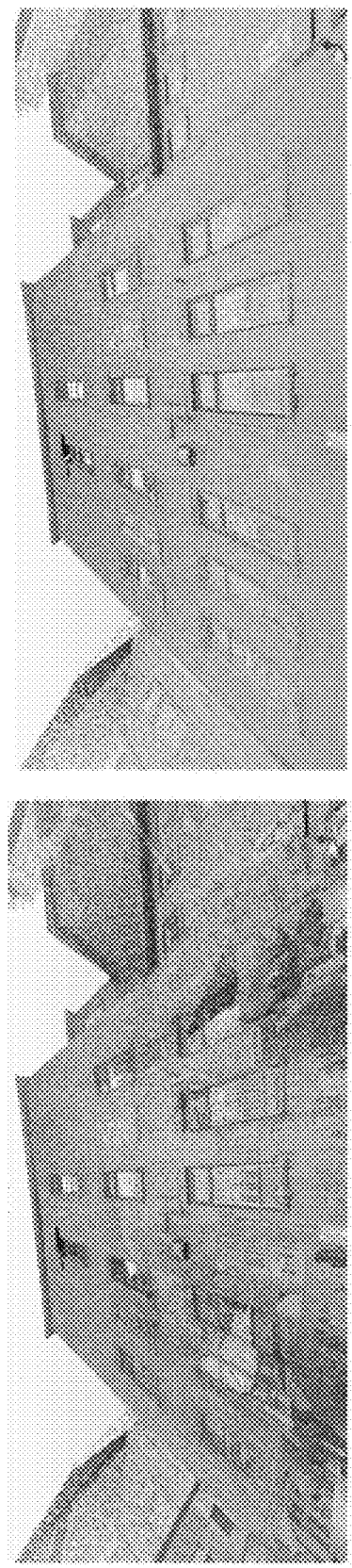
FIG. 26A shows a rendering of a point cloud representing a building using a conventional rendering method.
FIG. 26B shows a rendering of the same point cloud rendered in FIG. 26A according to an embodiment of the present invention.

As discussed above with respect to FIGS. 4-6, embodiments of the present invention provide methods of generating processed buffers that contain a subset of the 3D points of an input 3D point cloud with background points filtered out. The processed buffers can be used for enhanced rendering of the 3D point cloud such that the background points are not rendered. For instance, consider the examples illustrated in FIGS. 26A and 26B. FIG. 26A shows a rendering of a point cloud representing a building using a conventional rendering method. In FIG. 26A, points representing the façade of the building, as well as points inside the building, are rendered. FIG. 26B shows a rendering of the same point cloud using the method discussed above with respect to FIG. 4-6. In FIG. 26B, only the points representing the façade are rendered. According to an embodiment of the present invention, the input 3D point cloud may be combined with the processed buffers to generate a filtered point cloud containing only the points representing the façade.

Figure 27:
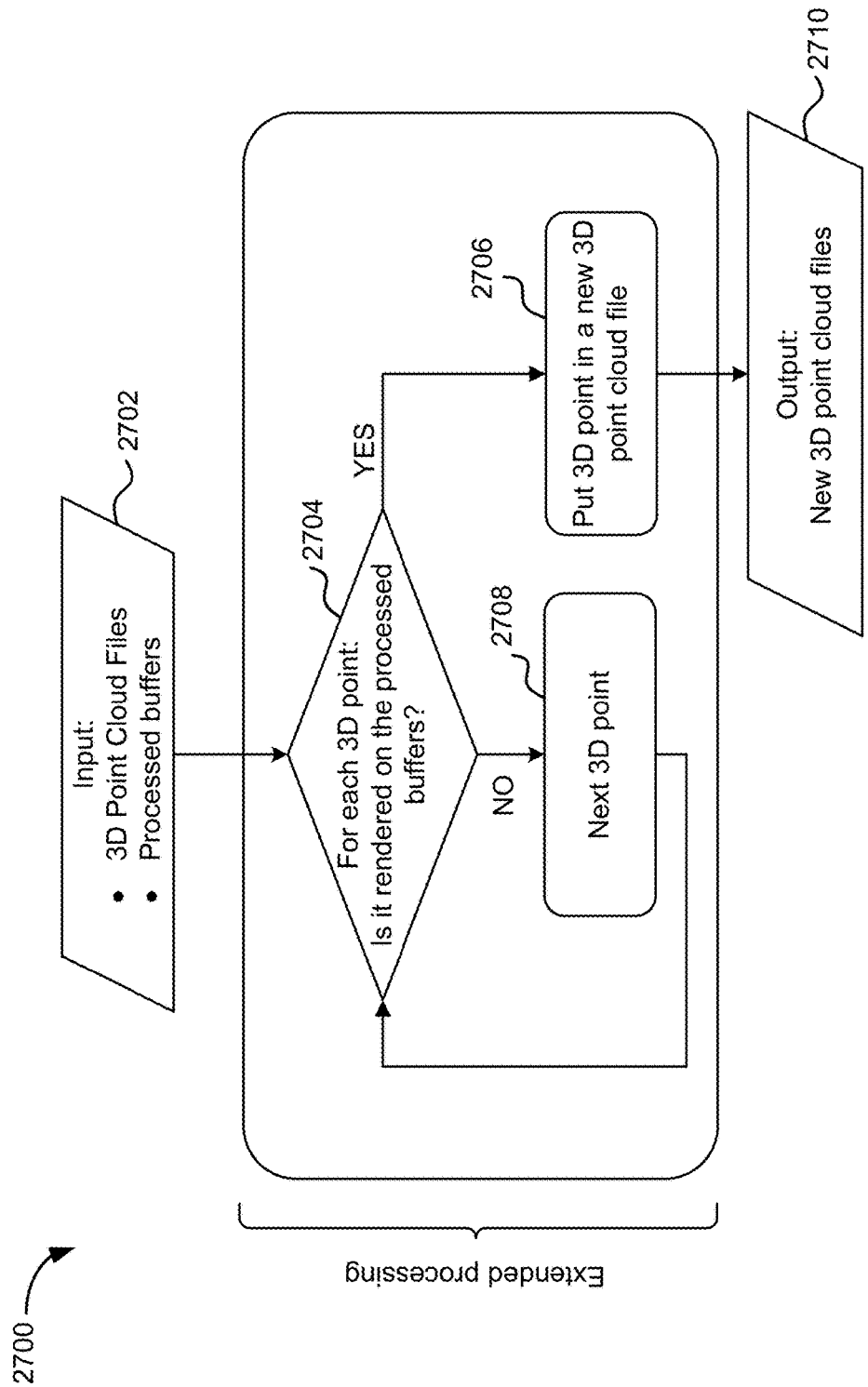
FIG. 27 shows a simplified flowchart illustrating a method of generating a filtered 3D point cloud according to an embodiment of the present invention.

FIG. 27 shows a simplified flowchart illustrating a method 2700 of generating a filtered 3D point cloud according to an embodiment of the present invention. The method 2700 includes, at 2702, inputting a 3D point cloud and the processed buffers for the 3D point cloud. The processed buffers may include a filtered depth buffer and a filtered color buffer, which may be obtained by the methods described above with respect to FIGS. 4-6.

The method 2700 further includes, at 2704, for each 3D point of the input 3D point cloud, determining whether the 3D point is included in the processed buffers. The method 2700 further includes, at 2706, upon determining that the 3D point is included in the processed buffers, putting the 3D point in a new 3D point cloud. The method 2700 further includes, at 2708, upon determining that the 3D point is not included in the processed buffers, proceeding to the next 3D point without putting the 3D point in the new 3D point cloud. The steps of 2704, 2706, and 2708 may be repeated until all points in the input 3D point cloud have been considered. The method 2700 further includes, at 2710, outputting the new 3D point cloud. The new point cloud comprises a filter 3D point cloud that includes only those points of the input 3D point cloud that are included in the processed buffers.

According to an embodiment of the present invention, the processed buffers may be combined with the input 3D point cloud to generate one or more segmented 3D point clouds. For instance, consider the example illustrated in FIGS. 18A and 18B. There, several regions are identified in the point cloud, where each region includes points representing a surface. Each surface may represent a meaningful object such as a wall or ceiling. Each region is rendered in a respective color in FIG. 18B. In some cases, a user may be interested in generating a new 3D point cloud for each surface.

Figure 28:
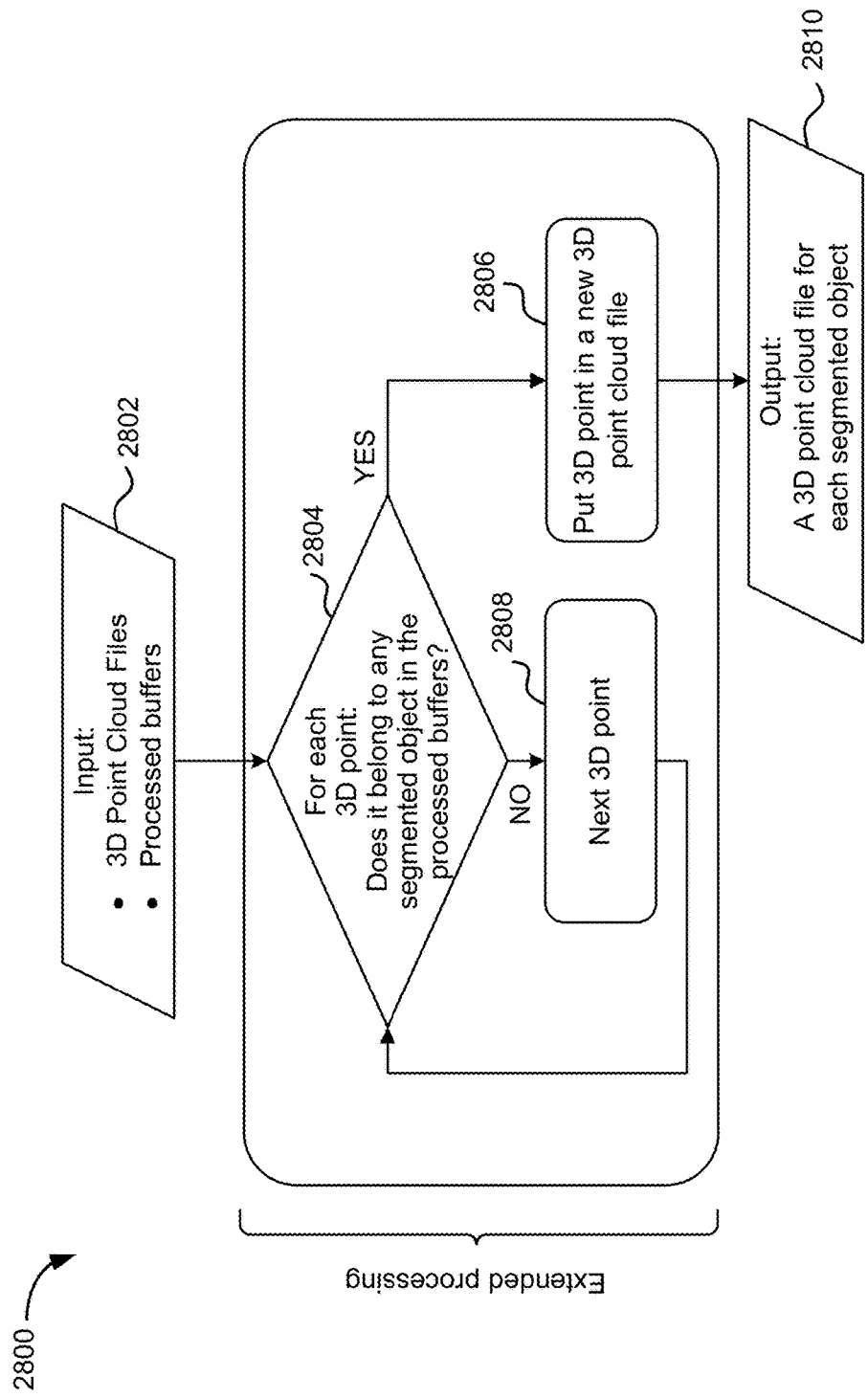
FIG. 28 shows a simplified flowchart illustrating a method of generating one or more segmented 3D point clouds according to an embodiment of the present invention.

FIG. 28 shows a simplified flowchart illustrating a method 2800 of generating one or more segmented 3D point clouds according to an embodiment of the present invention. The method 2800 includes, at 2802, inputting a 3D point cloud and the processed buffers for the 3D point cloud. The processed buffers may include a segmented depth buffer and/or a segmented color buffer, which may be obtained by the method described above with respect to FIG. 14. The segmented depth buffer and/or the segmented color buffer may contain regions representing meaningful objects.

The method 2800 further includes, at 2804, for each 3D point of the input 3D point cloud, determining whether the 3D point belongs to any segmented region in the segmented buffers. The method 2800 further includes, at 2806, upon determining that the 3D point belongs to a segmented region, putting the 3D point in a new 3D point cloud. According to an embodiment, a plurality of new 3D point clouds may be created, each new 3D point cloud corresponding to a respective segmented region. The method 2800 further includes, at 2808, upon determining that the 3D point does not belong to any segmented region, proceeding to the next 3D point without putting the 3D point in any new 3D point cloud. The steps of 2804, 2806, and 2808 may be repeated until all points in the input 3D point cloud have been considered. The method 2800 further includes, at 2810, outputting the new 3D point clouds. Each new point cloud contains 3D points of the input 3D point cloud that belong to a respective segmented region.

According to an embodiment of the present invention, the processed buffers may be combined with the input 3D point cloud to generate one or more classified 3D point clouds. For instance, consider the examples illustrated in FIGS. 23A and 23B. In FIG. 23B, objects are rendered according to semantic classifications. For example, buildings are rendered in blue color, vegetation (e.g., the trees) is rendered in green color, the ground is rendered in brown color, and so on. In some cases, a user may be interested in generating a 3D point cloud for each semantic class (e.g., ground, buildings, and vegetation).

Figure 29:
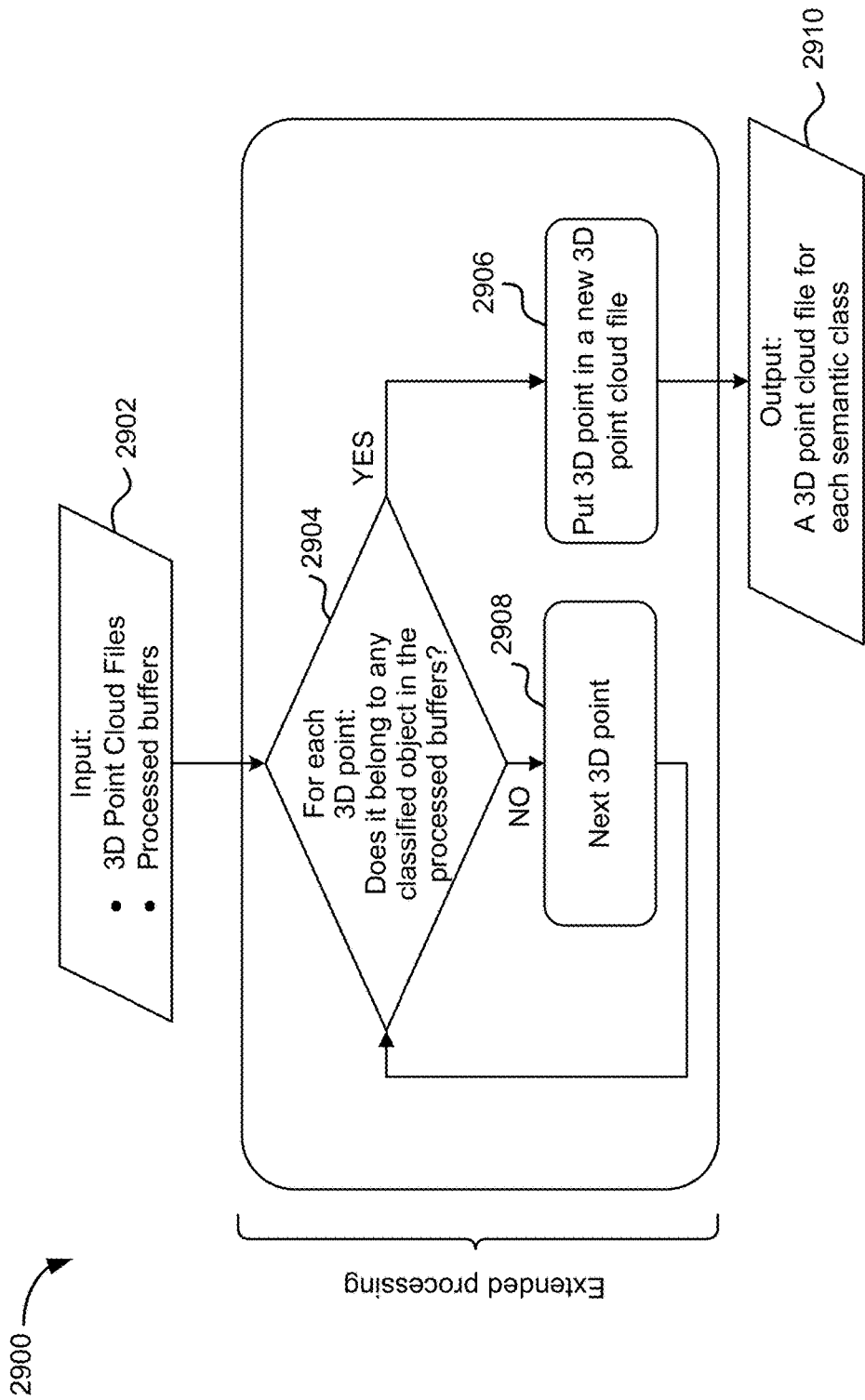
FIG. 29 shows a simplified flowchart illustrating a method of generating one or more classified 3D point clouds according to an embodiment of the present invention.

FIG. 29 shows a simplified flowchart illustrating a method 2900 of generating one or more classified 3D point clouds according to an embodiment of the present invention. The method 2900 includes, at 2902, inputting a 3D point cloud and the processed buffers for the 3D point cloud. The processed buffers may include a classified depth buffer and/or a classified color buffer, which may be obtained by the method described above with respect to FIG. 15. The classified depth buffer and/or the classified color buffer may contain regions representing different classified objects, for example ground, buildings, people, cars, and the like.

The method 2900 further includes, at 2904, for each 3D point of the input 3D point cloud, determining whether the 3D point belongs to any classified object in the classified buffers. The method 2900 further includes, at 2906, upon determining that the 3D point belongs to a classified object, putting the 3D point in a new 3D point cloud. According to an embodiment, a plurality of new 3D point clouds may be created, each new 3D point cloud corresponding to a respective classified object. The method 2900 further includes, at 2908, upon determining that the 3D point does not belong to any classified object, proceeding to the next 3D point without putting the 3D point in any new 3D point cloud. The steps of 2904, 2906, and 2908 may be repeated until all points of the input 3D point cloud have been considered. The method 2900 further includes, at 2910, outputting the new 3D point clouds. Each new point cloud contains 3D points of the input 3D point cloud that belong to a respective classified object.

Figure 30A:
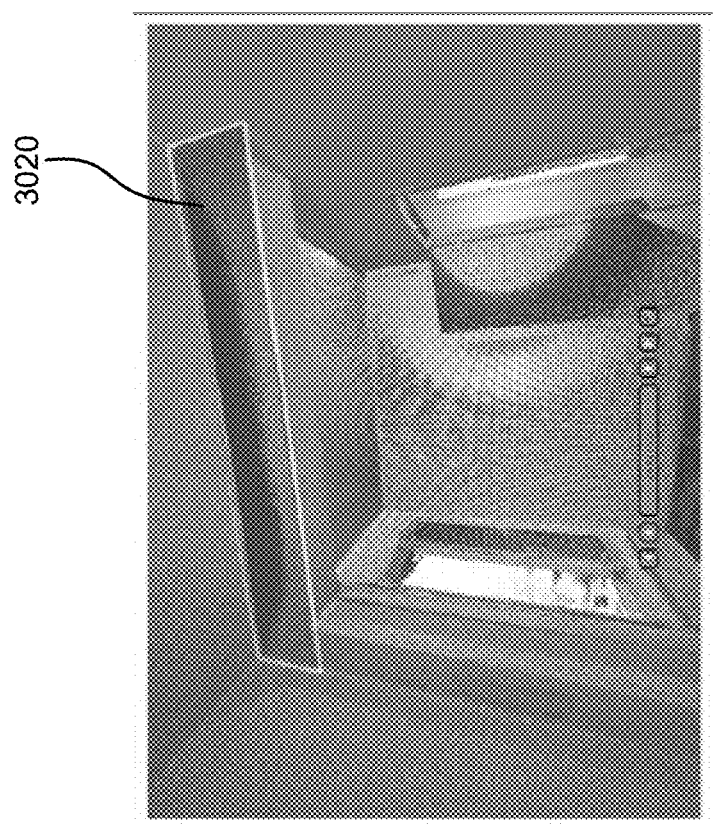
FIG. 30A shows a rendering of a 3D point cloud according to an embodiment of the present invention.
Figure 30B:
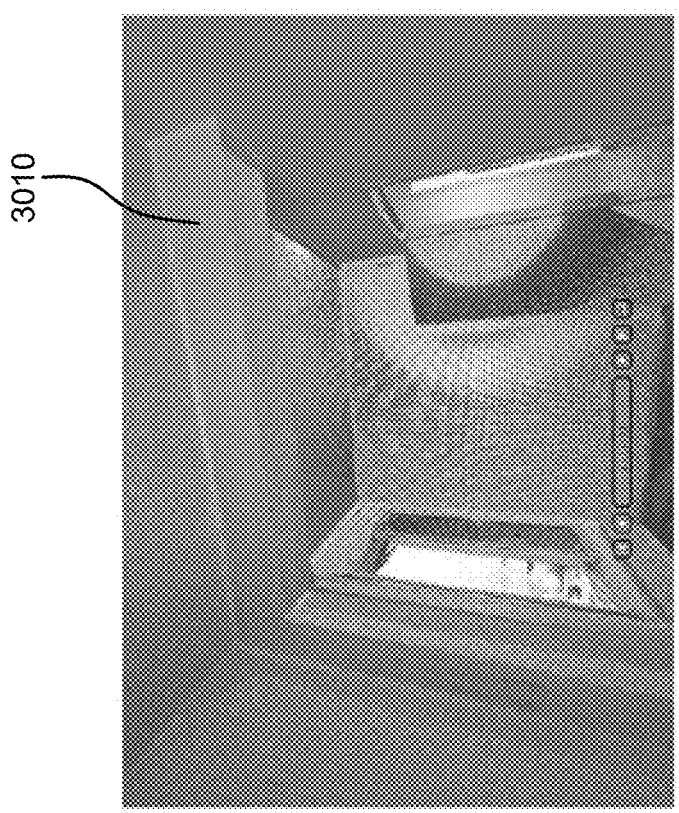
FIG. 30B shows the rendering of the same 3D point cloud rendered in FIG. 30A with a rendering of a 3D model plane superimposed, according to an embodiment of the present invention.

According to an embodiment of the present invention, the output 3D point clouds generated by the methods described above with respect to FIGS. 27-29 may be used to generate 3D models, such as meshes, geometries, polylines, planes, polygons, and the like. Such models may be used in computer aided design (CAD) applications. For instance, in the example illustrated in FIGS. 30A and 30B, a user may be interested in generating a 3D model (e.g., a plane) for the beam 3010 shown in FIG. 30A. According to an embodiment of the present invention, segmented and/or classified buffers may be used to extract 3D points belonging to the beam 3010. Modeling can then be applied to the extracted 3D points to generate a 3D model plane that fits those 3D points. A rendering of the 3D model plane 3020 (in red color) may be superimposed on an rendering of the original 3D point cloud, as shown in FIG. 30B.

Figure 31B:
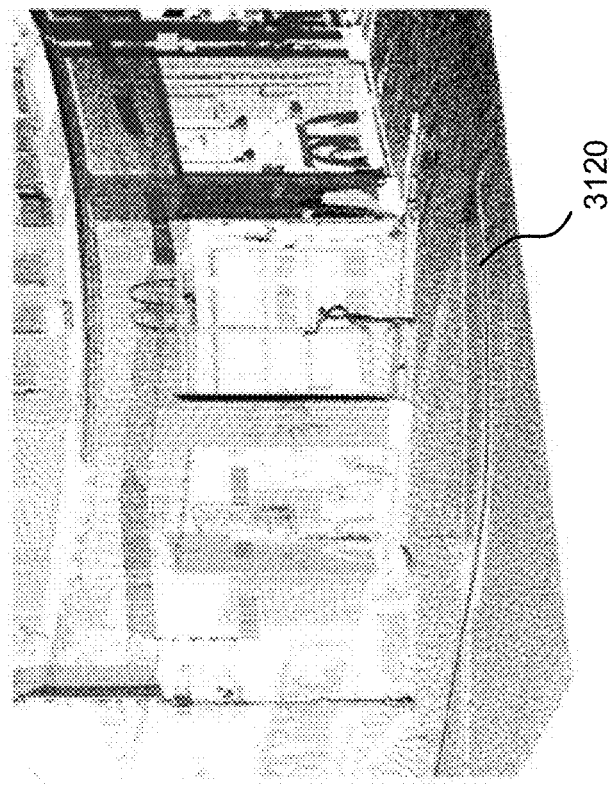
FIG. 31B shows the rendering of the same 3D point cloud rendered in FIG. 31A with a rendering of a 3D model polyline superimposed, according to an embodiment of the present invention.
Figure 31A:
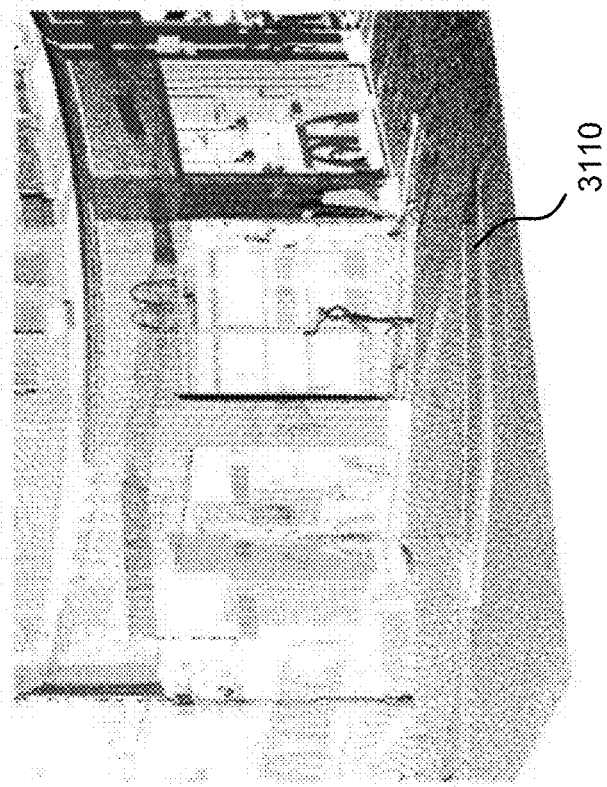
FIG. 31A shows a rendering of a 3D point cloud according to an embodiment of the present invention.

In another example illustrated in FIGS. 31A and 31B, a user may be interested in generating a 3D polyline for the curb 3110 shown in FIG. 31A. According to an embodiment of the present invention, segmented and/or classified buffers may be used to extract 3D points belonging to the curb 3110. Modeling can then be applied to the extracted 3D points to generate a 3D model polyline that fits those 3D points. A rendering of the 3D model polyline 3120 (in red color) may be superimposed on an rendering of the original 3D point cloud, as shown in FIG. 31B.

Figure 32:
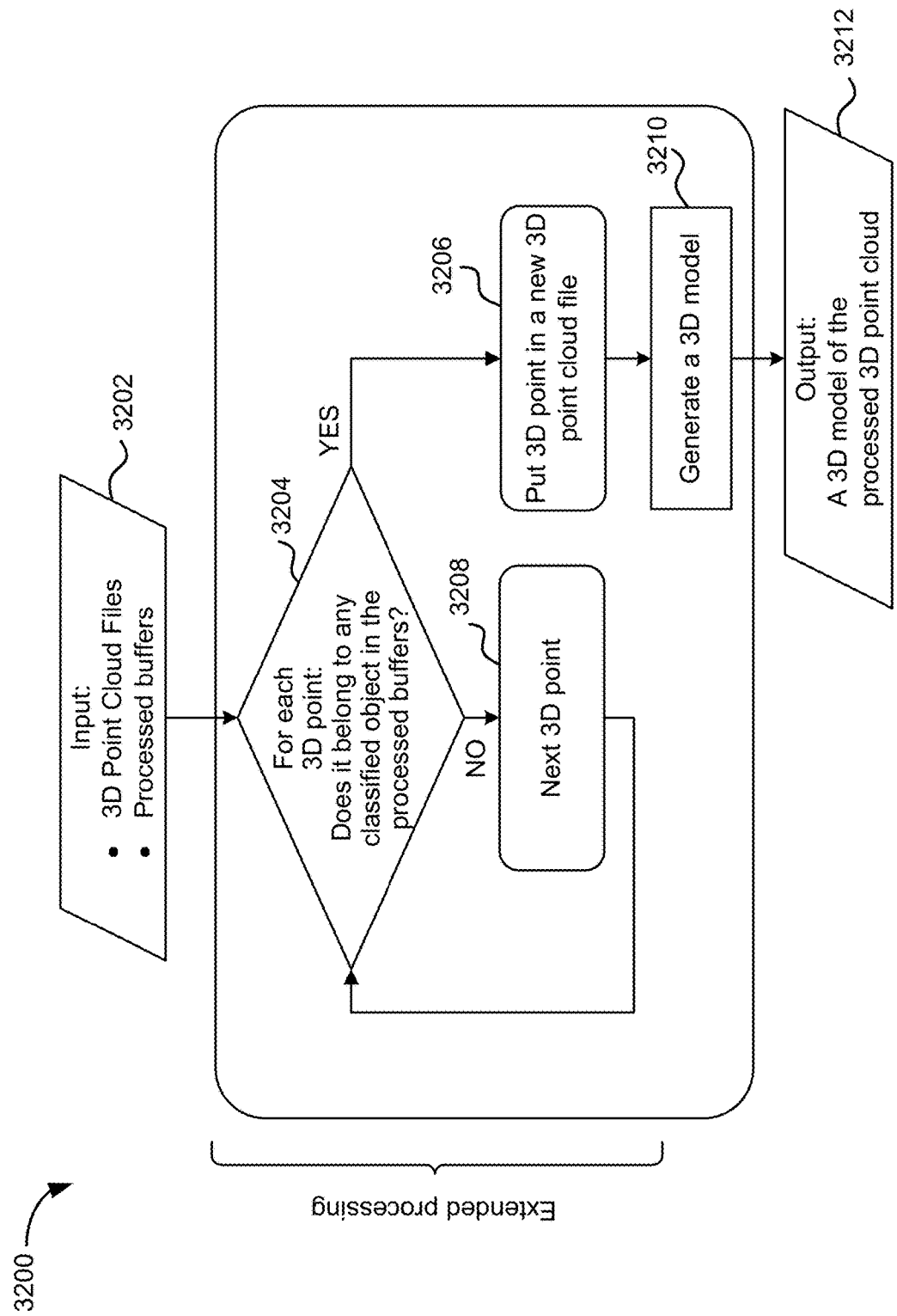
FIG. 32 shows a simplified flowchart illustrating a method of generating a 3D model using processed buffers of a 3D point cloud according to an embodiment of the present invention.

FIG. 32 shows a simplified flowchart illustrating a method 3200 of generating a 3D model using processed buffers of a 3D point cloud according to an embodiment of the present invention. The method 3200 includes, at 3202, inputting a 3D point cloud and the processed buffers for the 3D point cloud. In one embodiment, the processed buffers includes classified buffers, which may be obtained by the method described above with respect to FIG. 15. The classified buffers may contain regions representing different classified objects, for example ground, buildings, people, cars, and the like.

The method 3200 further includes, at 3204, for each 3D point of the input 3D point cloud, determining whether the 3D point belongs to a classified object in the classified buffers. The method 3200 further includes, at 3206, upon determining that the 3D point belongs to the classified object, putting the 3D point in a new 3D point cloud. The method 3200 further includes, at 3208, upon determining that the 3D point does not belong to the classified object, proceeding to the next 3D point without putting the 3D point in the new 3D point cloud. The steps of 3204, 3206, and 3208 may be repeated until all points of the input 3D point cloud have been considered. The method 3200 further includes, at 3210, generating a 3D model using the new 3D point cloud. According to an embodiment, the 3D model is generated to fit the 3D points in the new point cloud. The method 3200 further includes, at 3212, outputting the 3D model.

It should be appreciated that the specific steps illustrated in each of FIGS. 2, 4-6, 8-11, 13-17, 24-25, 27-29, and 32 provide particular methods according to various embodiments of the present invention. Other sequences of steps may also be performed according to alternative embodiments. For example, alternative embodiments of the present invention may perform the steps outlined above in a different order. Moreover, the individual steps illustrated in each of FIGS. 2, 4-6, 8-11, 13-17, 24-25, 27-29, and 32 may include multiple sub-steps that may be performed in various sequences as appropriate to the individual step. Furthermore, additional steps may be added or removed depending on the particular applications.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense.

Thus, the scope of the present invention should be determined not with reference to the above description, but should be determined with reference to the appended claims along with their full scope of equivalents.

What is claimed is:

1. A method of rendering a three-dimensional point cloud in a two-dimensional display, the method comprising:
    inputting the three-dimensional point cloud including three-dimensional coordinates of a set of points representing surfaces of one or more objects;
    creating a depth buffer for the three-dimensional point cloud, the depth buffer including depth data for the set of points from a viewpoint location;
    determining a foreground depth buffer, the foreground depth buffer including a foreground depth for each respective pixel area of the two-dimensional display, wherein the foreground depth buffer is determined by:
        applying an opening operation of a mathematical morphology algorithm to the depth buffer to remove background points from the set of points to obtain a plurality of foreground points; and
        applying a closing operation of the mathematical morphology algorithm to reconnect the plurality of foreground points with each other;
    filtering the depth buffer to obtain a filtered depth buffer by, for each respective pixel area of the two-dimensional display:
        comparing a depth of each respective point corresponding to the respective pixel area to a foreground depth of the respective pixel area; and
        removing the respective point from the depth buffer upon determining that the depth of the respective point is greater than the foreground depth of the respective pixel area; and
    outputting the filtered depth buffer to the two-dimensional display for displaying a two-dimensional image of the three-dimensional point cloud from the viewpoint location.

2. The method of claim 1, wherein the depth buffer resides in a graphics processing unit (GPU).

3. The method of claim 2, wherein determining the foreground depth buffer and filtering the depth buffer are performed using the GPU.

4. The method of claim 3, wherein determining the foreground depth buffer and filtering the depth buffer are performed on-the-fly for real-time navigation of the three-dimensional point cloud.

5. The method of claim 1, wherein the three-dimensional point cloud includes color data for each respective point of the set of points, and the method further comprising:
    creating a color buffer for the three-dimensional point cloud using the color data for each respective point;
    filtering the color buffer to obtain a filtered color buffer by, for each respective pixel area of the two-dimensional display, removing the respective point from the color buffer upon determining that the depth of the respective point is greater than the foreground depth of the respective pixel area; and
    outputting the filtered color buffer to the two-dimensional display along with the filtered depth buffer for displaying the two-dimensional image of the three-dimensional point cloud.

6. A method of rendering a three-dimensional point cloud in a two-dimensional display, the method comprising:
    inputting the three-dimensional point cloud including three-dimensional coordinates of a set of points representing surfaces of one or more objects;
    creating a depth buffer for the three-dimensional point cloud, the depth buffer including depth data for the set of points from a viewpoint location;
    determining a foreground depth buffer, the foreground depth buffer including a foreground depth for each respective pixel area of the two-dimensional display, wherein the foreground depth buffer is determined by:
        applying an opening operation of a mathematical morphology algorithm to the depth buffer to remove background points from the set of points to obtain a plurality of foreground points; and
        applying a closing operation of the mathematical morphology algorithm to reconnect the plurality of foreground points with each other;
    filtering the depth buffer to obtain a filtered depth buffer by, for each respective pixel area of the two-dimensional display:
        comparing a depth of each respective point corresponding to the respective pixel area to a foreground depth of the respective pixel area; and
        removing the respective point from the depth buffer upon determining that the depth of the respective point is greater than the foreground depth of the respective pixel area;
    performing interpolation among remaining points in the filtered depth buffer to obtain an interpolated depth buffer; and
    outputting the interpolated depth buffer to the two-dimensional display for displaying a two-dimensional image of the three-dimensional point cloud from the viewpoint location.

7. The method of claim 6, wherein the interpolation is performed using one of a linear interpolation algorithm, a polynomial interpolation algorithm, a morphological processing algorithm, or an inpainting technique.

8. The method of claim 6, wherein the three-dimensional point cloud includes color data for each respective point of the set of points, and the method further comprising:
    creating a color buffer for the three-dimensional point cloud using the color data for each respective point;
    filtering the color buffer to obtain a filtered color buffer by, for each respective pixel area of the two-dimensional display, removing the respective point from the color buffer upon determining that the depth of the respective point is greater than the foreground depth of the respective pixel area;
    performing interpolation among remaining points in the filtered color buffer to obtain an interpolated color buffer; and
    outputting the interpolated color buffer to the two-dimensional display along with the interpolated depth buffer for displaying the two-dimensional image of the three-dimensional point cloud.

9. The method of claim 8, wherein the interpolation among remaining points in the filtered color buffer is performed in parallel to performing interpolation among remaining points in the filtered depth buffer.

10. A method of rendering a three-dimensional point cloud in a two-dimensional display, the method comprising:
    inputting the three-dimensional point cloud including three-dimensional coordinates of a set of points representing surfaces of one or more objects, the three-dimensional point cloud further including color data for each respective point of the set of points;
    creating a depth buffer for the three-dimensional point cloud, the depth buffer including depth data for the set of points from a viewpoint location;

creating a color buffer for the three-dimensional point cloud using the color data for each respective point;

segmenting the depth buffer and the color buffer to obtain a segmented depth buffer and a segmented color buffer based on at least one of color, depth, intensity, or orientation, wherein each of the segmented depth buffer and the segmented color buffer includes one or more segmented regions, each segmented region representing a single object of the one or more objects represented by the set of points; and outputting the segmented depth buffer and the segmented color buffer to the two-dimensional display for displaying a two-dimensional image of the three-dimensional point cloud from the viewpoint location.

11. The method of claim 10, wherein segmenting the depth buffer and the color buffer is based on a predetermined depth criterion.

12. The method of claim 10, wherein segmenting the depth buffer and the color buffer is based on orientation, and wherein each segmented region has a respective orientation.

13. The method of claim 10, wherein segmenting the depth buffer and the color buffer is based on a predetermined intensity criterion.

14. The method of claim 10, further comprising:
assigning a respective color for each segmented region.

15. The method of claim 10, further comprising:
assigning a respective semantic class to each segmented region in the segmented depth buffer or the segmented color buffer; and
assigning a respective color for each semantic class.

16. A method of rendering a three-dimensional point cloud in a two-dimensional display, the method comprising:
inputting the three-dimensional point cloud including three-dimensional coordinates of a set of points representing surfaces of one or more objects;
creating a depth buffer for the three-dimensional point cloud, the depth buffer including depth data for the set of points from a viewpoint location;
creating a color buffer for the three-dimensional point cloud, the color buffer including color data for the set of points from a viewpoint location;
performing customized image processing to the depth buffer and the color buffer to obtain a processed depth buffer and a processed color buffer, wherein performing customized image processing comprises:
segmenting the depth buffer and the color buffer, based on at least one of color, depth, intensity, or orientation, to obtain one or more segmented regions, each segmented region representing a single object of the one or more objects represented by the set of points; and
assigning a respective semantic class to each segmented region; and
outputting the processed depth buffer and the processed color buffer to the two-dimensional display for displaying a two-dimensional image of the three-dimensional point cloud from the viewpoint location.

17. The method of claim 16, wherein performing customized image processing further comprises:
determining a foreground depth buffer by, for each respective pixel area of the two-dimensional display, determining a foreground depth by detecting a closest point to the viewpoint location among a subset of the set of points corresponding to the respective pixel area, and assigning a depth of the closest point as the foreground depth for the respective pixel area;
filtering the depth buffer and the color buffer by, for each respective pixel area of the two-dimensional display:
comparing a depth of each respective point corresponding to the respective pixel area to a foreground depth of the respective pixel area; and
removing the respective point from the depth buffer and the color buffer upon determining that the depth of the respective point is greater than the foreground depth of the respective pixel area.

18. The method of claim 17, wherein determining the foreground depth buffer and filtering the depth buffer are performed on-the-fly for real-time navigation of the three-dimensional point cloud.

19. The method of claim 17, wherein performing customized image processing further comprises:
performing interpolation among remaining points in the depth buffer and the color buffer for surface-like rendering of the three-dimensional point cloud.

20. The method of claim 19, wherein interpolation is performed using one of a linear interpolation algorithm, a polynomial interpolation algorithm, a morphological processing algorithm, or an inpainting technique.

21. The method of claim 16, wherein performing customized image processing further comprises:
assigning a respective color for each segmented region.

22. The method of claim 16, wherein performing customized image processing further comprises:
assigning a respective color for each semantic class.

* * * * *